US008065293B2

(12) United States Patent
Mukerjee et al.

(10) Patent No.: US 8,065,293 B2
(45) Date of Patent: Nov. 22, 2011

(54) SELF-COMPACTING PATTERN INDEXER: STORING, INDEXING AND ACCESSING INFORMATION IN A GRAPH-LIKE DATA STRUCTURE

(75) Inventors: Kunal Mukerjee, Redmond, WA (US); R. Donald Thompson, III, Sammamish, WA (US); Jeffrey Cole, Redmond, WA (US); Brendan Meeder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 11/923,430

(22) Filed: Oct. 24, 2007

(65) Prior Publication Data

US 2009/0112905 A1 Apr. 30, 2009

(51) Int. Cl.
*G06F 17/30* (2006.01)

(52) U.S. Cl. ........ 707/711; 707/696; 707/739; 707/740; 707/741; 707/742; 707/743; 707/744; 707/745; 707/746; 707/802

(58) Field of Classification Search .................. 707/798, 707/711, 696, 739–746, 802
See application file for complete search history.

(56) References Cited

U.S. PATENT DOCUMENTS

| | | | | |
|---|---|---|---|---|
| 5,258,924 | A | 11/1993 | Call et al. | 382/103 |
| 5,675,701 | A | 10/1997 | Kleijn et al. | 704/222 |
| 5,819,224 | A | 10/1998 | Xydeas | 704/266 |
| 5,857,196 | A * | 1/1999 | Angle et al. | 707/102 |
| 6,006,188 | A | 12/1999 | Bogdashevsky et al. | 704/270 |
| 6,009,387 | A | 12/1999 | Ramaswamy et al. | 704/222 |
| 6,018,741 | A * | 1/2000 | Howland et al. | 707/102 |
| 6,223,155 | B1 | 4/2001 | Bayya | 704/243 |
| 6,292,778 | B1 | 9/2001 | Sukkar | 704/256.4 |
| 6,347,297 | B1 | 2/2002 | Asghar et al. | 704/243 |
| 6,418,412 | B1 | 7/2002 | Asghar et al. | 704/256.5 |
| 6,631,346 | B1 * | 10/2003 | Karaorman et al. | 704/9 |
| 6,778,970 | B2 | 8/2004 | Au | 706/55 |
| 7,203,635 | B2 | 4/2007 | Oliver et al. | 703/22 |

(Continued)

OTHER PUBLICATIONS

Lee et al.; "A New Method to Achieve Fast Acoustic Matching for Speech Recognition"; 4 pgs.

(Continued)

*Primary Examiner* — Frantz Coby
(74) *Attorney, Agent, or Firm* — Merchant & Gould

(57) ABSTRACT

An indexing system uses a graph-like data structure that clusters features indexes together. The minimum atomic value in the data structure is represented as a leaf node which is either a single feature index or a sequence of two or more feature indexes when a minimum sequence length is imposed. Root nodes are formed as clustered collections of leaf nodes and/or other root nodes. Context nodes are formed from root nodes that are associated with content that is being indexed. Links between a root node and other nodes each include a sequence order value that is used to maintain the sequencing order for feature indexes relative to the root node. The collection of nodes forms a graph-like data structure, where each context node is indexed according to the sequenced pattern of feature indexes. Clusters can be split, merged, and promoted to increase the efficiency in searching the data structure.

25 Claims, 23 Drawing Sheets

U.S. PATENT DOCUMENTS

| | | | | |
|---|---|---|---|---|
| 7,912,839 | B1 * | 3/2011 | Asher | 707/743 |
| 2002/0133348 | A1 * | 9/2002 | Pearson et al. | 704/258 |
| 2002/0164152 | A1 | 11/2002 | Kato et al. | 386/248 |
| 2007/0112765 | A1 * | 5/2007 | Vishik | 707/5 |
| 2007/0131094 | A1 * | 6/2007 | Kemp | 84/609 |
| 2009/0015447 | A1 * | 1/2009 | Kilbank | 341/60 |
| 2009/0043575 | A1 | 2/2009 | Thompson et al. | 704/230 |

OTHER PUBLICATIONS

Moënne-Loccoz et al.; "Local Feature Trajectories for Efficient Event-Based Indexing of Video Sequences"; 10 pgs.

Youssef et al.; "Disturbance Utilizing Dynamic Time Warping Classifier"; IEEE Transactions on Power Delivery, vol. 19, No. 1, Jan. 2004; pp. 272-278.

* cited by examiner

200

| | 210 | 220 | 230 | 240 |
|---|---|---|---|---|
| 1 | aa | aa | aa | aa |
| 2 | ae | ae | ae | ae |
| 3 | ah | ah | ah | ah |
| 4 | ao | ao | ao | ao |
| 5 | aw | aw | aw | aw |
| 6 | ax | ax | ax | ax |
| 7 | ay | ay | ay | ay |
| 8 | b | b | b | b |
| 9 | ch | ch | ch | ch |
| 10 | d | d | d | d |
| 11 | dh | dh | dh | dh |
| 12 | dx | dx | dx | dx |
| 13 | eh | eh | eh | eh |
| 14 | er | er | er | er |
| 15 | ey | ey | ey | ey |
| 16 | f | f | f | f |
| 17 | g | g | g | g |
| 18 | hh | hh | hh | hh |
| 19 | ih | ih | ih | ih |
| 20 | ix | ix | ix | ix |
| 21 | iy | iy | iy | iy |
| 22 | jh | jh | jh | jh |
| 23 | k | k | k | k |
| 24 | l | l | l | l |
| 25 | m | m | m | m |
| 26 | n | n | n | n |
| 27 | ng | ng | ng | ng |
| 28 | ow | ow | ow | ow |
| 29 | oy | oy | oy | oy |
| 30 | p | p | p | p |
| 31 | r | r | r | r |
| 32 | s | s | s | s |
| 33 | sh | sh | sh | sh |
| 34 | t | t | t | t |
| 35 | th | th | th | th |
| 36 | uh | uh | uh | uh |
| 37 | uw | uw | uw | uw |
| 38 | v | v | v | v |
| 39 | w | w | w | w |
| 40 | y | y | y | y |
| 41 | z | z | z | z |
| 42 | zh | zh | zh | zh |
| 43 | sil | sil | sil | sil |

Feature Index Values

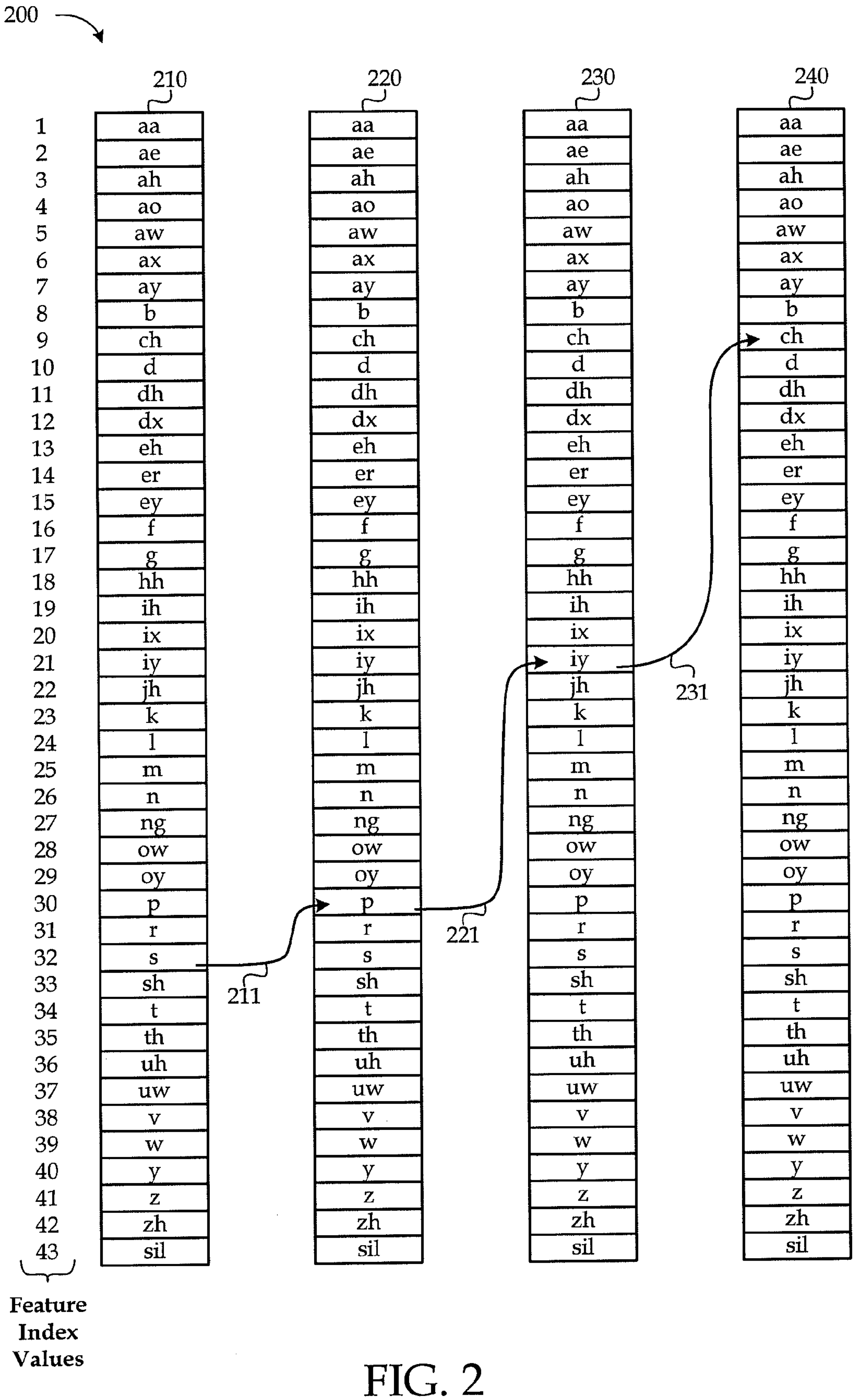

FIG. 2

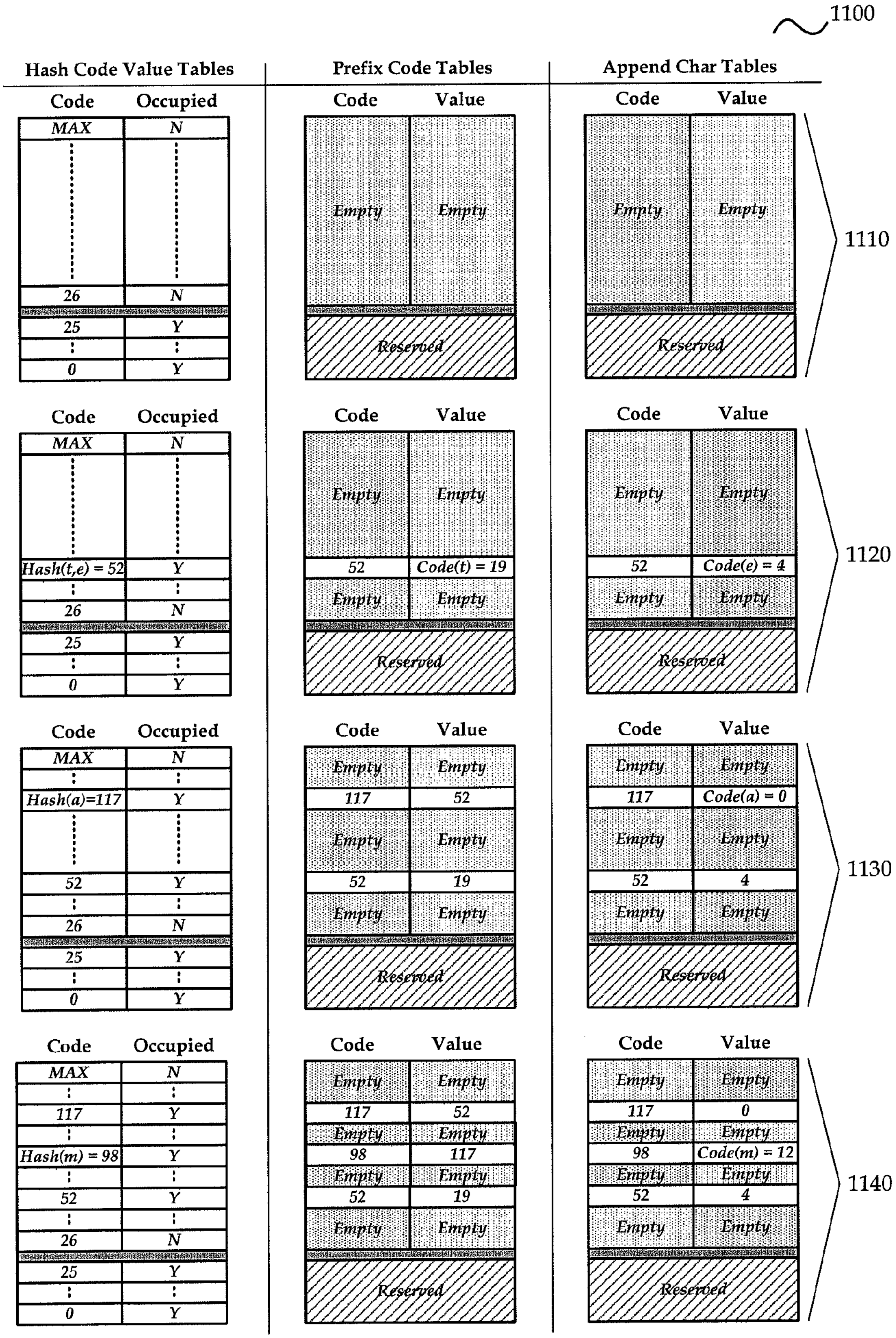

FIG. 11A

Hash Code Value Tables | Prefix Code Tables | Append Char Tables

1110

| Code | Occupied |
|---|---|
| MAX | N |
| : | : |
| 26 | N |
| 25 | Y |
| : | : |
| 0 | Y |

| Code | Value |
|---|---|
| Empty | Empty |
| Reserved | |

| Code | Value |
|---|---|
| Empty | Empty |
| Reserved | |

1120

| Code | Occupied |
|---|---|
| MAX | N |
| : | : |
| Hash(t,e) = 52 | Y |
| : | : |
| 26 | N |
| 25 | Y |
| : | : |
| 0 | Y |

| Code | Value |
|---|---|
| Empty | Empty |
| 52 | Code(t) = 19 |
| Empty | Empty |
| Reserved | |

| Code | Value |
|---|---|
| Empty | Empty |
| 52 | Code(e) = 4 |
| Empty | Empty |
| Reserved | |

1130

| Code | Occupied |
|---|---|
| MAX | N |
| : | : |
| Hash(a)=117 | Y |
| : | : |
| 52 | Y |
| : | : |
| 26 | N |
| 25 | Y |
| : | : |
| 0 | Y |

| Code | Value |
|---|---|
| Empty | Empty |
| 117 | 52 |
| Empty | Empty |
| 52 | 19 |
| Empty | Empty |
| Reserved | |

| Code | Value |
|---|---|
| Empty | Empty |
| 117 | Code(a) = 0 |
| Empty | Empty |
| 52 | 4 |
| Empty | Empty |
| Reserved | |

1140

| Code | Occupied |
|---|---|
| MAX | N |
| : | : |
| 117 | Y |
| : | : |
| Hash(m) = 98 | Y |
| : | : |
| 52 | Y |
| : | : |
| 26 | N |
| 25 | Y |
| : | : |
| 0 | Y |

| Code | Value |
|---|---|
| Empty | Empty |
| 117 | 52 |
| Empty | Empty |
| 98 | 117 |
| Empty | Empty |
| 52 | 19 |
| Empty | Empty |
| Reserved | |

| Code | Value |
|---|---|
| Empty | Empty |
| 117 | 0 |
| Empty | Empty |
| 98 | Code(m) = 12 |
| Empty | Empty |
| 52 | 4 |
| Empty | Empty |
| Reserved | |

1200

*Utterance*

1201

| | | | | | | | | | | | | | | | | | | | | | | | | |
|---|---|---|---|---|---|---|---|---|---|---|---|---|---|---|---|---|---|---|---|---|---|---|---|---|
| C | A | R | S | A | R | E | S | C | A | R | I | E | R | T | H | A | N | S | C | A | R | V | E | S |

*Query*

1202, 1203

| | | | | | | | |
|---|---|---|---|---|---|---|---|
| *Index No.* | 0 | 1 | 2 | 3 | 4 | 5 | 6 |
| *Symbol* | S | C | A | R | V | E | S |

*Matched Patterns of Length N, 2≤N≤ 3*

| *Matched Pattern* | C | A | R | S | A | R | E | S | C | A | R | I | E | R | T | H | A | N | S | C | A | R | V | E | S |
|---|---|---|---|---|---|---|---|---|---|---|---|---|---|---|---|---|---|---|---|---|---|---|---|---|---|
| *SC* | | | | | | | | 0 | 1 | | | | | | | | | | 0 | 1 | | | | | |
| *CA* | 1 | 2 | | | | | | | 1 | 2 | | | | | | | | | | 1 | 2 | | | | |
| *AR* | | 2 | 3 | | 2 | 3 | | | | 2 | 3 | | | | | | | | | | 2 | 3 | | | |
| *RV* | | | | | | | | | | | | | | | | | | | | | | 3 | 4 | | |
| *VE* | | | | | | | | | | | | | | | | | | | | | | | 4 | 5 | |
| *ES* | | | | | | | 5 | 6 | | | | | | | | | | | | | | | | 5 | 6 |
| *SCA* | | | | | | | | 0 | 1 | 2 | | | | | | | | | 0 | 1 | 2 | | | | |
| *CAR* | 1 | 2 | 3 | | | | | | 1 | 2 | 3 | | | | | | | | | 1 | 2 | 3 | | | |
| *ARV* | | | | | | | | | | | | | | | | | | | | | 2 | 3 | 4 | | |
| *RVE* | | | | | | | | | | | | | | | | | | | | | | 3 | 4 | 5 | |
| *VES* | | | | | | | | | | | | | | | | | | | | | | | 4 | 5 | 6 |

1206 *Heuristic Scoring*

| Matched Pattern | C | A | R | S | A | R | E | S | C | A | R | I | E | R | T | H | A | N | S | C | A | R | V | E | S | Add | Sub. | Total |
|---|---|---|---|---|---|---|---|---|---|---|---|---|---|---|---|---|---|---|---|---|---|---|---|---|---|---|---|---|
| SC | | | | | | | | 0 | 1 | | | | | | | | | | | | | | | | | 4 | 0 | 4 |
| SC | | | | | | | | | | | | | | | | | | | 0 | 1 | | | | | | 4 | 0 | 8 |
| CA | 1 | 2 | | | | | | | | | | | | | | | | | | | | | | | | 4 | 0 | 12 |
| CA | | | | | | | | | 1 | 2 | | | | | | | | | | | | | | | | 16 | -4 | 24 |
| CA | | | | | | | | | | | | | | | | | | | | 1 | 2 | | | | | 16 | -4 | 36 |
| AR | | 2 | 3 | | | | | | | | | | | | | | | | | | | | | | | 16 | -4 | 48 |
| AR | | | | | 2 | 3 | | | | | | | | | | | | | | | | | | | | 4 | 0 | 52 |
| AR | | | | | | | | | | 2 | 3 | | | | | | | | | | | | | | | 64 | -16 | 100 |
| AR | | | | | | | | | | | | | | | | | | | | | 2 | 3 | | | | 64 | -16 | 148 |
| RV | | | | | | | | | | | | | | | | | | | | | | 3 | 4 | | | 256 | -64 | 340 |
| VE | | | | | | | | | | | | | | | | | | | | | | | 4 | 5 | | 1024 | -256 | 1110 |
| ES | | | | | | | 5 | 6 | | | | | | | | | | | | | | | | | | 0 | 0 | 1110 |
| ES | | | | | | | | | | | | | | | | | | | | | | | | 5 | 6 | 4096 | -1024 | 4180 |
| SCA | | | | | | | | 0 | 1 | 2 | | | | | | | | | | | | | | | | 0 | 0 | 4180 |
| SCA | | | | | | | | | | | | | | | | | | | 0 | 1 | 2 | | | | | 0 | 0 | 4180 |
| CAR | 1 | 2 | 3 | | | | | | | | | | | | | | | | | | | | | | | 0 | 0 | 4180 |
| CAR | | | | | | | | | 1 | 2 | 3 | | | | | | | | | | | | | | | 0 | 0 | 4180 |
| CAR | | | | | | | | | | | | | | | | | | | | 1 | 2 | 3 | | | | 0 | 0 | 4180 |
| ARV | | | | | | | | | | | | | | | | | | | | | 2 | 3 | 4 | | | 0 | 0 | 4180 |
| RVE | | | | | | | | | | | | | | | | | | | | | | 3 | 4 | 5 | | 0 | 0 | 4180 |
| VES | | | | | | | | | | | | | | | | | | | | | | | 4 | 5 | 6 | 0 | 0 | 4180 |

1207 *Matched Pattern, Heuristic Score = 4180*

| C | A | R | S | A | R | E | S | C | A | R | I | E | R | T | H | A | N | S | C | A | R | V | E | S |
|---|---|---|---|---|---|---|---|---|---|---|---|---|---|---|---|---|---|---|---|---|---|---|---|---|
| 1 | 2 | 3 | | 2 | 3 | | 0 | 1 | 2 | 3 | | | | | | | | 0 | 1 | 2 | 3 | 4 | 5 | 6 |

*Pseudo-Code for Insertion Process (1401)*

```
PerformInsert (SequenceToInsert)
{
 for each symbol position in SequenceToInsert do
  Swap Source and Destination Symbol Queues
  Add all lattice symbols (i.e. 1-grams) at the current position to the Destination queue
  for each "run" of symbols in the Source queue do
   if HashedTreeTraversal(tree node exists for the current run + new symbol)
    Add the current sequence ref (i.e. utterance id + offset) to that node
   else if we can create a new n-gram node where n <= MaxNGram
    Create a new node and add it to the tree
    Path compress (old n-1 gram, new n-gram)
   end if
  end for
 end for
}
```

FIG. 14A

*Pseudo-Code for Query Process (1402)*

```
PerformQuery (SequenceToQuery)
{
 for each symbol position in SequenceToQuery do
  Swap Source and Destination MatchingRun Queues
  Add all lattice symbols (i.e. 1-grams) at the current position to the Destination queue
  for each matching run in the Source queue do
   if HashedTreeTraversal(tree node exists for the current run + new symbol)
    Extend the match length by 1
    Make the old index of the matching run point at the new matching index node
    Score all indexed utterances that stopped matching at the last symbol of this run
   else // in this case the run is well and truly broken ...
    Score all indexed utterances that were matching with this run at the last symbol
   end if
  end for
 end for

 Score any runs that remain on the Destination MatchingRun Queue
 Run heuristic scoring to allow fragmented runs to extend
 Sort all matching utterances by score
}
```

FIG. 14B

*Pseudo-Code for Hashed Tree Traversal Process (1403)*

```
HashedTreeTraversal(current run symbol, new symbol)
{
 Index = (new symbol << HashingShift) ^ run symbol
 Offset = (index == 0)? 1 : TableSize - index

 while(true)
  if (CodeValues[index] == MaxValue)
   return index // No match was found, i.e. this is a new sequence
  end if

  if (PrefixCodes[index] == run symbol && AppendCharacters[index] == new symbol)
   return index; // in this case, a match was found
  end if

  // In this case, we have a collision - re-probe
  Index -= offset;
  if (index < 0)
   Index += TableSize
  end if
 end while
}
```

NB:

1. On average the number of probes was experimentally found to be < 3. So this operation is always constant time.
2. We maintain the following arrays which allow us to do symbol-level compression (i.e. dictionary based): a) PrefixCodes; b) AppendCharacters; and c) CodeValues, in addition to playing their role in the hashed tree traversal scheme.
3. Initially all non-leaf symbols have their CodeValues[symbol] initialized to MaxValue – this signifies non-occupancy.

FIG. 14C

*Pseudo-Code for Path Compression Process (1404)*

```
PathCompress(Old n-1 gram node, New n-gram node)
{
 for each sequence ref in old n-1 gram node
   if the sequence matches on its next symbol with the n-gram
     Add the sequence ref to the n-gram node
   end if
 end for
}
```

*Pseudo-Code for Heuristic Scoring Process (1405)*

ScoreIndexedUtterances(Old n-1 gram index node, New n-gram index node)

{

Form the Union over all utterances that matched until the n-1 gram index ($U_{n-1}$)

Form the Union over all utterances that match until the new n-gram index node ($U_n$)

Take the set difference: $D = U_n - U_{n-1}$

Score all members of D exponentially in the length of the matching run ($2^{l-1}$)

SELF-COMPACTING PATTERN INDEXER: STORING, INDEXING AND ACCESSING INFORMATION IN A GRAPH-LIKE DATA STRUCTURE

FIELD OF THE INVENTION

The present disclosure is generally related to indexing methods that may be used by databases, search engines, query and retrieval systems, context sensitive data mining, context mapping, language identification, and robotic systems. Raw baseline features are aggregated, abstracted and indexed for later retrieval or manipulation. The feature index is the quantization number for the underlying features that are represented by the abstraction. Quantum indexes are used to correlate the features to previously stored features.

BACKGROUND OF THE DISCLOSURE

Most information structures impose a cost for data entry and impose semantic constraints and assumptions on the data they hold. A hierarchy is created where the information is referenced and often cross-referenced in more than one instance. In one example, a hierarchy of information is created for "toys" and "robots." In this example, "toys" can be either categorized under "robots" or vice-versa. For such an example, a redundant reference can be created where the same information is stored twice, once for "toys" under "robots" and also once for "robots" under "toys."

The present disclosure has considered some intermediate representation (IR) techniques that can be utilized to construct a data structure from the input data. Example IR type structures can be found in: a prefix tree or TRIE, a classical string compression techniques such as Lempel-Ziv-Welch (LZW), a genomic approaches such as the so-called Basic Local Alignment Search Tool (BLAST), and dynamic time warping and longest common subsequence like approaches. However, the present disclosure recognizes and appreciates that conventional IR techniques can result in undesirable cross-references that can result in the same information being stored multiple times.

The present disclosure contemplates that a graph is far more powerful than hierarchies, trees, or lists, and can provide much better efficiency and flexibility. A graph imposes no burden on data entry, and offers "pivoting" or "tree shaking". A graph also allows the data to be characterized by statistics and probabilities—for example, the "similarity" measure of one "clique" to another, the "likelihood" of one "path" leading to another, etc. Hierarchies, trees, and lists can naturally and easily be "embedded" within a graph. A graph can serve as an ideal structure to store a set of arbitrary symbol streams (e.g. voice patterns) in a highly compressed way for later searching and retrieving. The present disclosure explores mechanisms and methods for indexing and organizing streams within a graph-like data structure.

BRIEF DESCRIPTION OF THE DRAWINGS

FIG. 2 is a graphical diagram illustrating a mapping from time-domain data to a sequence of quantized features for use in a quantum indexed graph-like data structure;

FIGS. 11A-11B are graphical diagrams illustrating example table generation using hashing codes;

FIGS. 12A-11B are graphical diagrams illustrating an example heuristic scoring process;

FIGS. 14A-14D illustrate example pseudo-code for insertion, queries, traversal, compression, and heuristic scoring for a graph-like data structure; all arranged in accordance with at least some features of the present disclosure.

DETAILED DESCRIPTION OF THE PREFERRED EMBODIMENT

Figure 1:
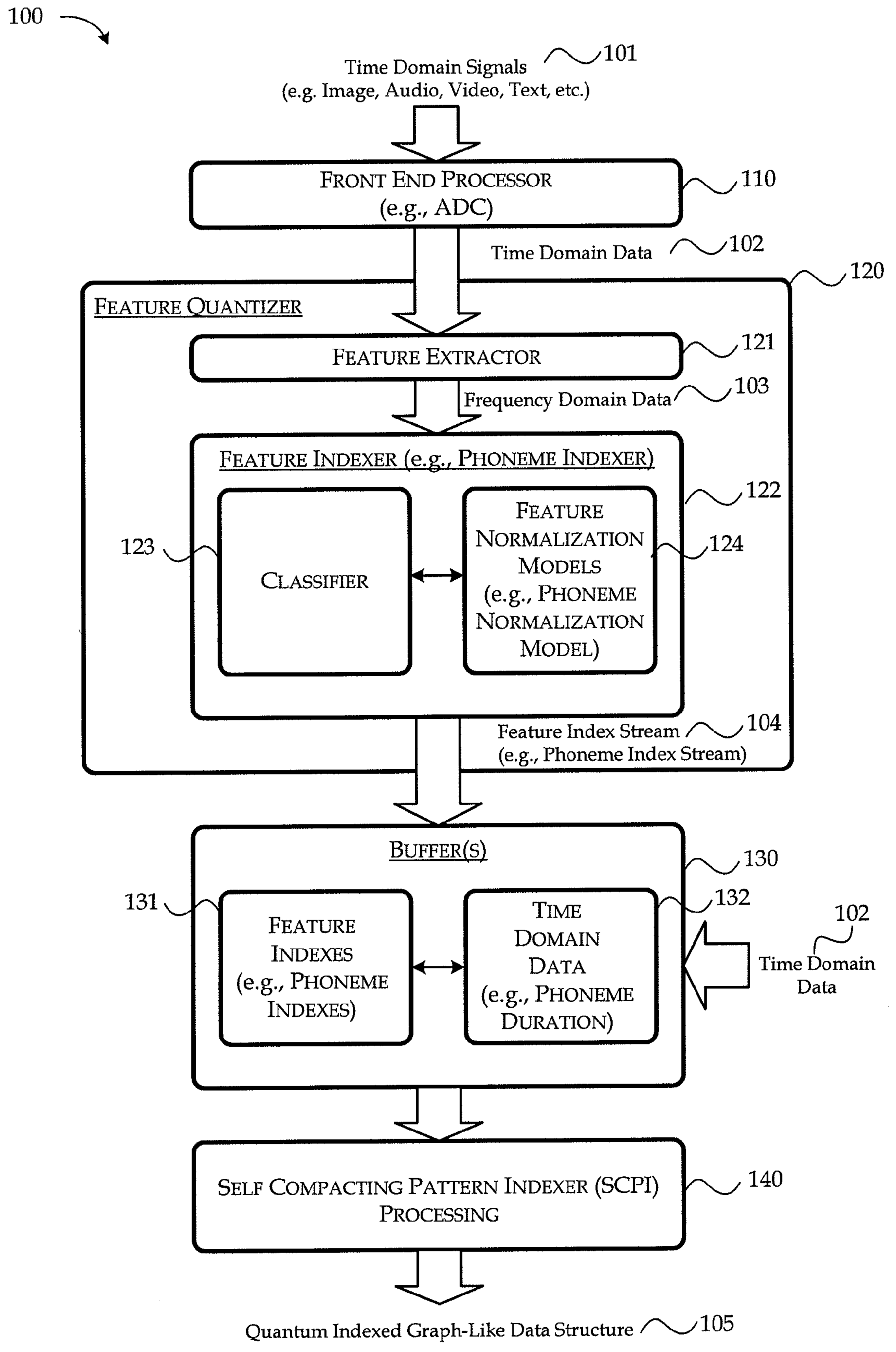
FIG. 1 is a block diagram illustrating an example system and/or apparatus.

Embodiments of the present invention will be described in detail with reference to the drawings, where like reference numerals represent like parts and assemblies throughout the several views. Reference to various embodiments does not limit the scope of the invention, which is limited only by the scope of the claims attached hereto. The examples set forth in this specification are not intended to be limiting and merely set forth some of the many possible embodiments for the claimed invention.

Briefly stated, the present disclosure is generally related to an indexing system using a graph-like data structure that clusters features indexes together. The minimum atomic value in the data structure is represented as a leaf node which is either a single feature index or a sequence of two or more feature indexes when a minimum sequence length is imposed. Root nodes are formed as clustered collections of leaf nodes and/or other root nodes. Context nodes are formed from root nodes that are associated with content that is being indexed. Links between a root node and other nodes each include a sequence order value that is used to maintain the sequencing order for feature indexes relative to the root node. The collection of nodes forms a graph-like data structure, where each context node is indexed according to the sequenced pattern of feature indexes. Clusters can be split, merged, and promoted to increase the efficiency in searching the data structure.

Although many of the examples described herein refer to a "feature index" as the smallest atomic value, or quanta, it is understood that in other examples a minimum sequence length is imposed and the smallest quanta corresponds to a sequence of feature indexes. For example, pairs of feature indexes may be used as the smallest atomic value when a minimum sequence length of two is employed. In such an example, the pairs of feature indexes are order dependent such that quanta formed by a pair of features indexes such as {a, b} is not equal to a transposition of the same feature indexes {b, a}.

General Discussion

The present disclosure is generally related to indexing methods that may be used by databases, search engines, query and retrieval systems, context sensitive data mining, context mapping, language identification, image recognition, and robotic systems. Raw baseline features from an input signal are aggregated, abstracted and indexed for later retrieval or manipulation. The feature index is the quantization number for the underlying features that are represented by an abstraction. Trajectories are used to signify how the features evolve over time. A highly optimized set of operations can be used to manipulate the quantized feature indexes, where the operations can be fine tuned independent from the base feature set.

The described indexing scheme can represent feature trajectories of different types such as scalar quantities or vector quantities. Example features are identified from the input signal, which can be a time domain varying signal. The input signal can be any variety of input signal such as, for example, audio signals, video signals, digital images, text sequences, as well as other varieties of input signals. For analog input signals that continuously vary over time, e.g. audio and video signals, the input signal can be broken into discrete digital values that form an input data stream. Each discrete digital value in the stream corresponds to a portion of the input signal at a particular point in time. For example, an audio signal can be converted (e.g., via an analog-to-digital converter) into 16-bit values that are sampled at a rate of 8 kbps. In this example, the audio signal can either be converted into digital values or encoded as digital values in some other numerical representation. A sequence of the digital values forms a digital data stream, where each successive digital value occurs at a later point in time relative to the input signal.

In some instances, the input signals are already in the digital domain and conversion is not required. For example, a digital picture is comprised of an array of pixel values arranged in a series of rows and columns. Each pixel from the image may include multiple color planes (e.g., red, green and blue), as well as other characterizing features such as intensity, saturation, tone, etc. Digital values associated with each pixel can be pipelined into the digital data stream. In one example, every pixel is pipelined in succession along a row in the digital image. In another example, a subset of the pixels are pipelined in succession (e.g., every other pixel, every fifth pixel, every other row, etc.). In some examples, a sample block grouping of pixels can be pipelined in succession (e.g., a 10×10 grouping of pixels from a larger image).

Once in the digital domain, features are identified from each set of digital values. In some examples, the features correspond to phonemes from human speech. In other examples, the features correspond to representative sampling of a digital image or video stream. In general, any data stream that includes a multiplicity of values occurring in succession to one another over time can be used to represent the input signal for identification of features. The features themselves can be representative of indexes to a feature mapping. For example, human speech can be represented by one of 43 speech phonemes, where each digital value in the data steam represents an index to one of the speech phonemes.

Each feature can be linked to other features that occur in succession to one another in the digital data stream to form a sequence of indexes. Each feature in the sequence represents a time quantized feature (e.g., speech phonetics), where any form of arbitrary quanta can be used that maps the feature to a unique identity. The sequence of indexed features can then be clustered together to form a sequence or pattern for indexing. In some examples, the clustered sequence can be represented as a vector (e.g., strings or arrays of objects such as letters, phonemes, integers, floating point values, etc.). Digital data, which can be compressed or uncompressed, is associated with the clustered sequence. The digital data in some examples is a digital representation of a time varying input signal, but is not limited to such signals.

The term SCPI represents a Self-Compacting Pattern Indexer, which is a process that forms and manages clusters of features that are identified by their quanta, where those clusters are used as an index into a graph-like data structure that identifies content. Although many of the examples described herein are examples where time varying data is mapped to a feature index stream that varies over time, any variety of arbitrary data is equally applicable (both time varying and non-time varying) to the described processes. Irrespective of the specific quanta utilized for mapping data to quantized features, the described SCPI processes and methods will create and manage a graph-like data structure for indexing those clustered features.

Throughout the present disclosure, the term "content" refers to any variety of data that may be associated with a context node in the quantum indexed graph-like data structure. Content can be provided in any reasonable form that is capable of storage, including but not limited to, a digitally encoded audio signal, a digitally encoded video signal, a digitally encoded photographic image, or a file. The term "file" refers to any aggregation of data that can be stored and/or manipulated whether storable in text, binary or any other encoded compressed or uncompressed format. Example files may include web pages, executable application programs, data used by application programs, and any other reasonable.

Illustrative System and/or Apparatus

FIG. 1 is a block diagram illustrating an example system and/or apparatus (100) that is arranged in accordance with some features of the present disclosure. Apparatus 100 is illustrated as processing time domain signals such as images, audio, video, or text, and generating quantized feature vectors that can be used as an index to the time domain signals. Apparatus 100 includes an optional front end processor block (110), a feature quantizer block (120), one or more buffer blocks (130), and a SCPI processing block (140). The various blocks described below are merely one example, and the functions provided by the blocks can be combined into fewer blocks, or separated into additional blocks as may be desired in a specific implementation.

Front end processor block 110 is arranged to generate time domain data 102 in response to time domain signals or input signals 101. In some examples, front end processor block 110 includes an analog-to-digital converter (ADC) that generates a stream of digital values (e.g., 16-bit values) by sampling a time varying input signal (e.g., audio, video, etc.) at a specified sampling rate (e.g., 4 kHz, 8 kHz, 16 kHz, 20 kHz, 22 kHz, 40 kHz, 44 kHz, etc.). In some other examples, front end processor block 110 may also include a pre-amplifier circuit that increases the signal levels such as for audio or video signals, a filter circuit to remove unwanted noise, a tone control circuit to balance the frequency response of audio signals, a color balancing circuit to adjust color intensity, saturation, etc., as well as other circuits such as a digital signal processor (DSP) that can otherwise perform similar functions. Front end processor block 110 can generally be described as an adapter that is arranged to condition input signals from an analog time domain into a digital time domain so that the input signal is translated into a stream of digital values or time domain data 102. The stream of digital values may be either fixed point number or floating point numbers as may be desired. In some instances where the input signal is inherently provided in a digital time domain (e.g., text input), the front end processor block 110 may be eliminated as unnecessary.

Feature quantizer block 120 is configured in communication with front end processor block 110, and arranged to generate a stream of feature indexes (104) in response to the digital time domain data (102). Each quantized feature is a numerical value that identifies a baseline feature associated with the input signal. Each successive numerical value from feature quantizer block 120 corresponds to another baseline feature that is identified with the input signal at a later point in time. In general, feature quantizer block 120 is arranged to map from a digital data space into a feature dependent space.

In some examples, feature quantizer block 120 can be implemented as hardware, software, or a combination of hardware and software. Example hardware systems can include a Fast Fourier Transform (FFT) signal processor such as may be found in a digital signal processor (DSP) or an application specific integrated circuit (ASIC), for example. The feature quantizer block 120 can be functionally partitioned into two blocks including a feature extractor (121), and a feature indexer (122), or the functions can be combined together into a single block. Feature extractor 121 is arranged to transform time domain data 102 into frequency domain data 103 by applying an FFT process. The capture window for the FFT process can be tuned for specific applications such as for human speech so that an appropriate number of data points from the time domain data steam are grouped together for FFT processing. Once data is in the frequency domain, feature indexer 122 can process the frequency spectrum (e.g., a series of frequency values with their specified magnitudes) to identify specific features such as human speech phonetics, for example. For this purpose, feature indexer 122 includes a classifier (123) that is arranged to compare the frequency domain data (103) to a normalized set of feature normalization models (124) to identify an appropriate feature index for each portion of the frequency domain data. For some examples, the feature index stream (104) corresponds to a series of numerical values (i.e., a phoneme index stream) that each represents a human speech phonetic at a particular point in time relative to the time domain data (102). When the feature index stream (104) corresponds to phonemes, the feature normalization models (124) correspond to phoneme normalization models. Example feature indexes will be described later.

Feature index steam 104 can be stored in one or more buffers (130) such as an associative memory. One portion of the buffers (131) can be dedicated to storing the stream of feature indexes (104) such as phoneme indexes, while another portion (132) of the buffers can be dedicated to storing the time domain data (102) such as the duration associated with phonemes. The two portions (131 and 132) are associated with one another so that sequences of indexes can be associated with the corresponding time domain data (102). In some examples, the buffers (130) are simply program memory that is used by a processor (e.g., micro-processor, micro-controller, DSP, ASIC, etc.) for general computational operations. In some other examples, the buffers (130) correspond to one or more internal memory banks in the processor. In still other examples, the buffers (130) are high-speed caching memories that are useful for pipelined operations. In general, any appropriate buffer mechanism can be used for storing the sequence of indexes that are associated with time domain data.

SCPI processing block 140 is arranged to access the buffers to process the sequence of feature indexes that are associated with a particular data set (e.g., time domain data in some examples) to generate one or more clusters that are indexed in a quantum indexed graph-like data structure (105). Each quantum index to the graph-like data structure (105) includes a link or pointer to a cluster of feature indexes from a sequence of feature indexes that form the data set (e.g., a set of feature indexes for a time domain digital data stream, a set of quanta taken from a digital image, etc.). In one example, a set of feature indexes occur in a sequence and those features are broken into one or more clusters. Once the features are clustered according to their feature indexes, a graph-like data structure is assembled with all of the clusters being tied to a common node that is associated with the underlying digital data (e.g., time domain data for time varying data inputs). An index to the common node is generated as the index to the underlying digital data, and the graph-like data structure is updated for searching and retrieval operations.

Sequences of feature indexes are recognized by the SCPI processing methods as a group or cluster. Each feature index can be isolated into a leaf node to represent the smallest atomic value or quantum. Leaf nodes are linked to a root node, which represents the clustered sequence of all feature indexes within a context. Root nodes consist of pointers to other node, which can either be leaf nodes, or other root nodes that represent common portion of a clustered sequence. The common portion of the clustered sequence can be considered a subsequence for a current context node.

As the graph-like data structure is updated, common subsequences may be formed and/or reformed through a variety of processes such as splitting and merging operations. Also, links to nodes and leafs may be updated through various other processes such as garbage collection operations, pattern promotion processes, node splitting processes, and/or node merging operations.

In some examples, there is a minimum sequence length that is imposed on the overall process that is greater than one. In such examples, the leaf nodes do not represent individual feature indexes and instead they represent a sequence of two or more feature indexes that occur in a specified order. For example a sequence of feature indexes 1,2 as a leaf node does not match the leaf node resulting from a reversed sequence of feature indexes 2,1. Although many of the examples described herein refer to the simplest case where a sequence length of one is used (i.e., where there is a one-to-one mapping between feature indexes and leaf nodes), the disclosure is not so limited and all of the examples described herein are equally applicable to any arbitrary sequence length minimum.

Example Sequence of Feature Indexes

FIG. 2 is a graphical diagram illustrating a mapping (200) from time-domain data to a sequence of quantized features for use in a quantum indexed graph-like data structure in accordance with the present disclosure.

The time domain data for the example of FIG. 2 can correspond to the output of an analog-to-digital converter (ADC) that generates data from an audio input signal (e.g., from an audio input stream, from a previously stored audio input stream, etc.). The time domain data can then be quantized into features that correspond to phonemes, where a large set of phonemes can be used to describe all forms of human speech. There is also a limited set of phonemes that occur in English and in most western languages that is sometimes referred to as the “arpabet.” For purposes of building practical speech recognition systems, some of the more esoteric phonemes can be eliminated without detracting from the ability to recognize speech from a combination of the remaining phonemes—this is usually done because not enough training data is available to properly characterize or "train" the acoustic model for such phonemes. The set of phonemes used for characterizing speech can thus typically be reduced down to a set of 40-50 phonemes.

A specific example set (P) of acoustic phonemes, which can be expressed as: P={aa, ae, ah, ao, aw, ax, ay, b, ch, d, dh, dx, eh, er, ey, f, g, hh, ih, ix, iy, jh, k, l, m, n, ng, ow, oy, p, r, s, sh, t, th, uh, uw, v, w, y, z, zh, sil}, which consists of 42 phonemes plus "sil", which stands for inter-phone silence. Time domain data for speech can then be quantized as a sequence of phonetic symbols from the set P. A phonetic to index mapping can thus be used to characterize the speech as a 1:1 mapping that uses 43 indexes, where the indexes to phonemes (or feature indexes) can from a set of numerical indexes (e.g., numbered 0 through 42) or from a symbolical name that is associated with the identified phoneme. The time domain data for speech can thus be segmented into time windows where each segment is evaluated to identify one of the phonetics from the set P, to generate a set of feature indexes that map to different phonetics.

FIG. 2 graphically illustrates an example feature index stream that is formed from time domain data for an audio signal that corresponds to an utterance of the word "speech" as may formed from an analog audio signal. The time domain data is captured and results in a feature index stream that maps to the following sequenced order of phonetics: "s", "p", "iy" and "ch".

The first phonetic "s" is mapped (210) to a first feature index value of 32. The second phonetic "p" is mapped (220) to a second feature index value of 30. The third phonetic "iy" is mapped (230) to a third feature index value of 32. The fourth phonetic "ch" is mapped (240) to a fourth feature index of 9.

In the time domain, a sequence is formed from the first feature index to the second feature index (211), from the second feature index to the third feature index (221), and from the third feature index to the fourth feature index (231). The example sequence thus comprises a set of feature indexes that are linked together in an ordered sequence.

Graph-Like Data Structure Generation Examples

Figure 3A:
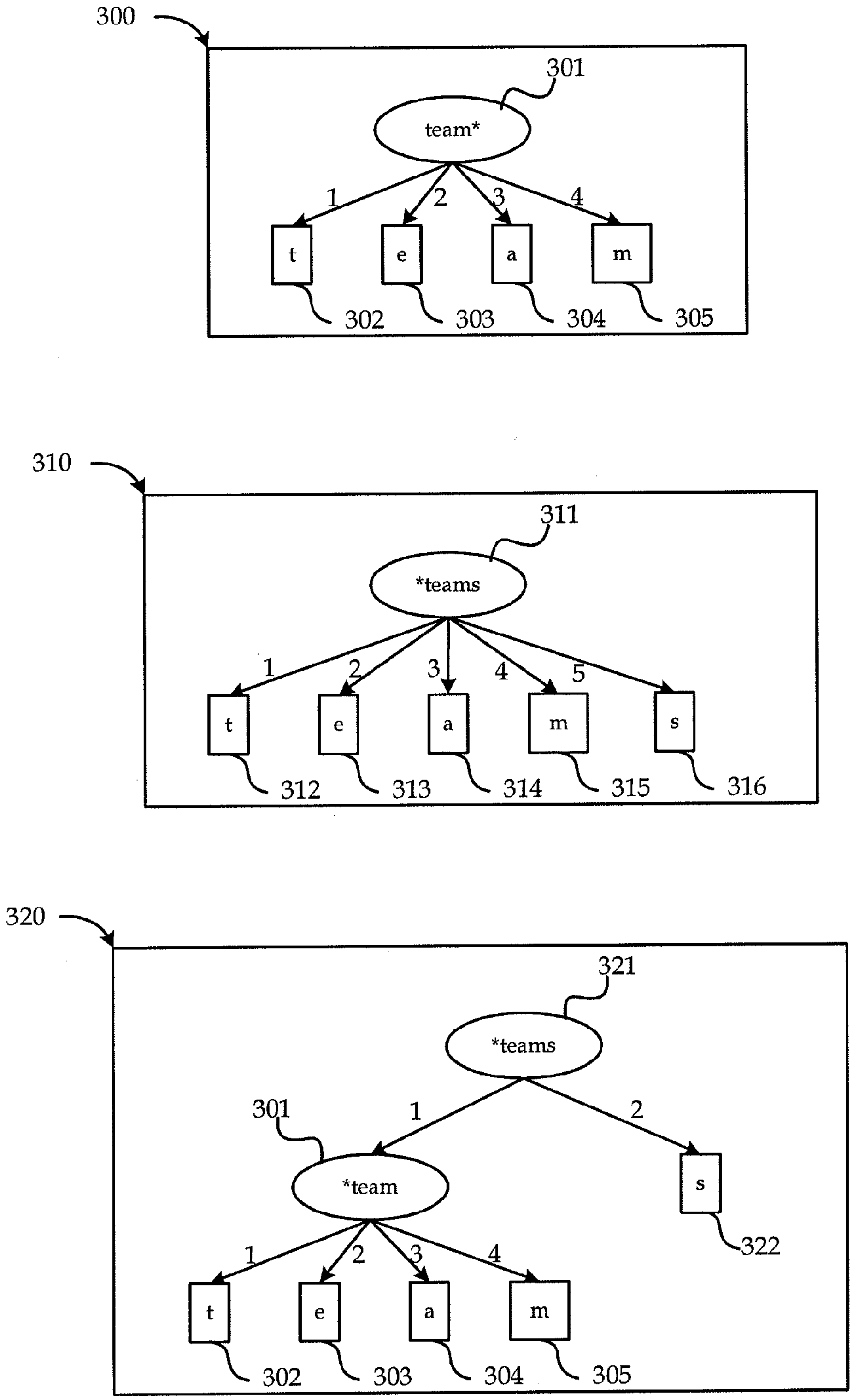
FIGS. 3A-3C are graphical diagrams illustrating the generation of example quantum indexed graph-like data structures.
Figure 3B:
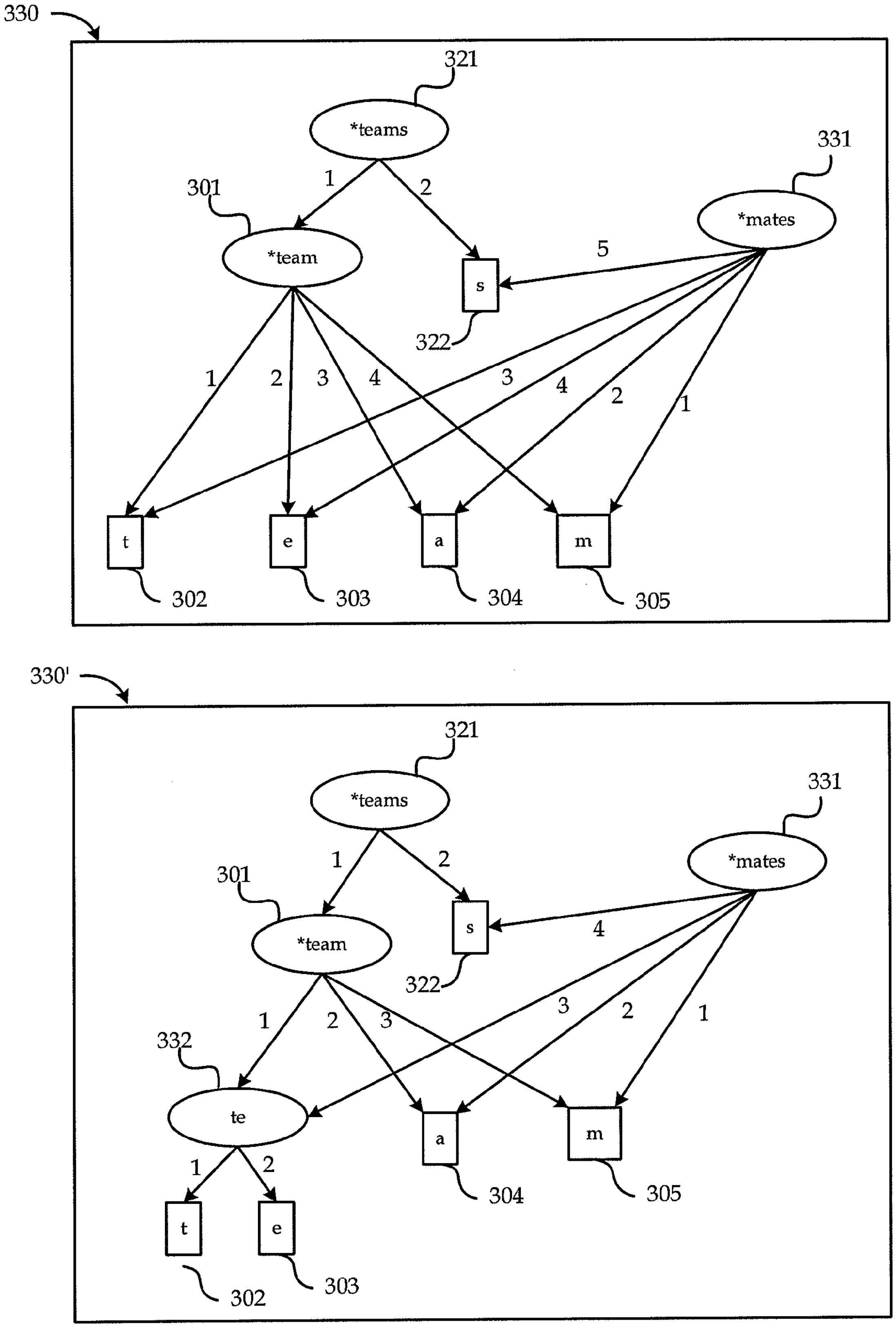
Figure 3C:
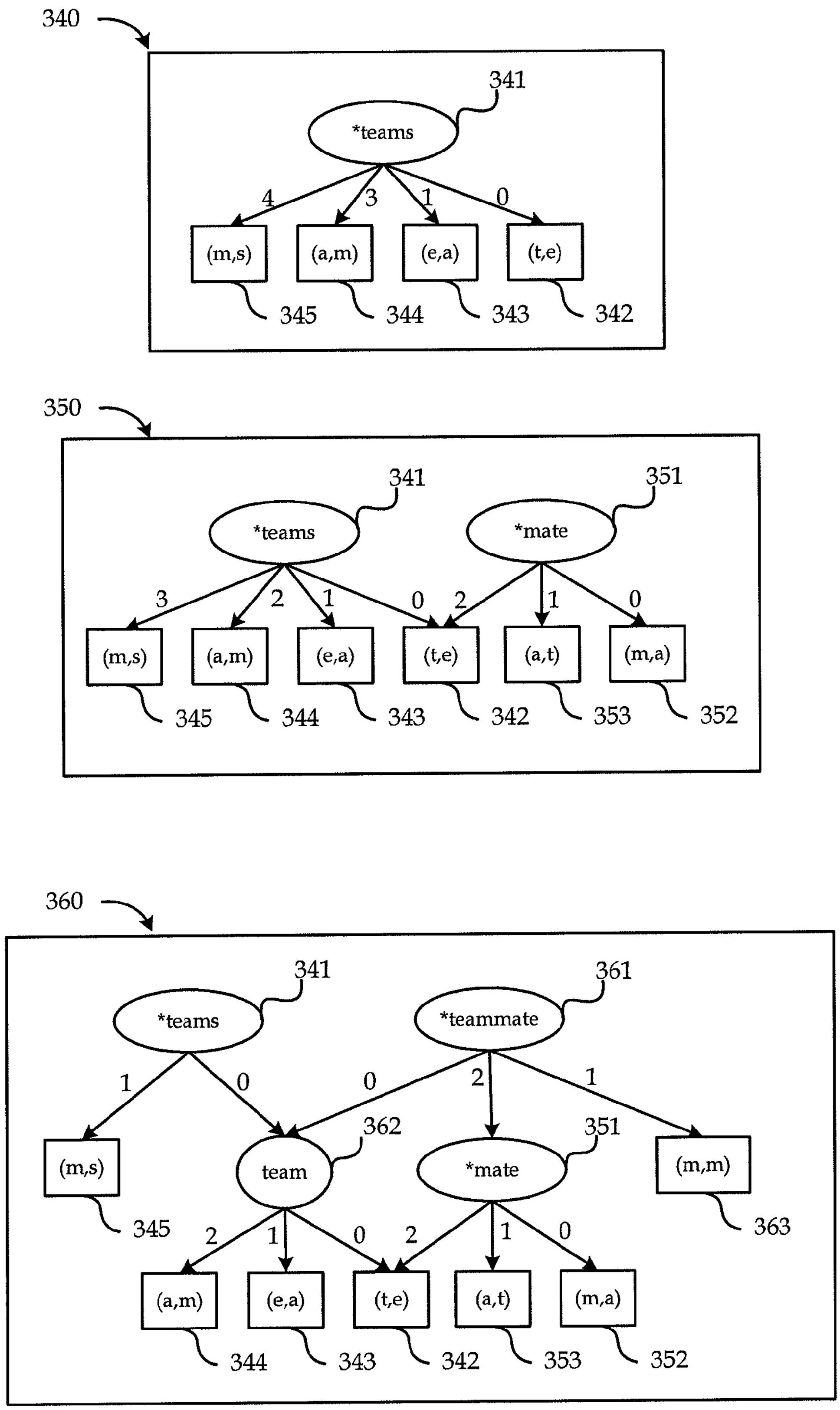

FIGS. 3A-3C are graphical diagrams illustrating the generation of quantum indexed graph-like data structures in accordance with at least some features of the present disclosure.

As illustrated in FIG. 3A, an example sequence can be processed to form a graph-like data structure (300) that includes a root node (301) that clusters together a set of leaf nodes (302-305). Root node 301 is an index into the character sequence "team." Leaf node 302 includes a feature index "t", while leaf nodes 303-305 each include a feature index for "e", "a", and "m", respectively. Each leaf node is linked to a root node with a pointer that includes a label that designates the order that the pointers occur in the sequence. For example, leaf node 302 is labeled with a sequence order value of "1" to indicate that the feature index "t" occurs first in the sequence for root node 301. Similarly, pointers from leaf nodes 303, 304 and 305 are each labeled with a sequence order value of "2", "3" and "4", respectively, designating the proper ordering for the sequence.

The asterisk (*) character at root node 301 indicates that this root node is a context node that serves as an index for content. The content may be a data sequence corresponding to any desired content. In one example, the content corresponds to a digitally encoded audio signal from an utterance from a user that is processed in a speech-to-text operation to result in the character sequence "team" as is described above. In other examples, the content may be a digital photograph, a digital video stream, or perhaps a web page that is associated with the query term "team". The content is associated with the context node so that a query into the index can be used to retrieve the content.

A second graph-like data structure (310) is illustrated for the character sequence "teams", which results in a context node (311), and feature indexes "t", "e", "a", "m", and "s" at each respective leaf node (312-316), with corresponding labels on the pointers designating the sequence order of 1-5 for the feature indexes.

Graphs 300 and 310 illustrate the generation of graphs where none of the feature indexes in their sequences are found in the existing graph-like data structure. Thus, for graphs 300 and 310, a single context node is created that clusters all of the feature indexes together for the indexed sequence as leaf nodes. However, in some instances a portion of the feature indexes for a sequence may already exist within the graph-like data structure and the resulting context node may then replace one or more leaf nodes either with other root nodes or context nodes that includes all of the feature indexes that are found in common between them.

A third graph-like data structure (320) illustrates the addition of a context node for "teams" to a graph-like data structure that already includes a context node for "team". Since a context node already exists for "team", there is no need to recreate those leaf nodes. Instead a new context node (321) is created for the sequence "teams" that includes a first link to the prior existing context node (301) for the sequence "team". A new leaf node (322) is created for the feature index "s" since it does not already exist in the data structure, and a second link is created between the new context node (321) and the new leaf node (322). The link values are updated for the new context node (321) to indicate the sequence ordering of "1" for the sub-sequence "team" and "2" for the leaf node with the feature index for "s". By nesting the sub-sequence from the previously indexed context within the new context, a highly compacted index is created without the need for double-entries or duplicates. Moreover, the underlying data (i.e. the content) need only be stored in a single instance when a new context node is created, further conserving space.

The above described graph-like data structure (320) can be further extended as additional context nodes (root nodes with associated content) are created. For example, the sequence "mates" can be added to the graph as is illustrated in FIG. 3B, where leaf node for feature indexes "m", "a", "t", "e", and "s" are identified as already existing in the data structure (330). In this instance, a new context node (331) for the sequence "mates" is created and links to the previously existing leaf nodes are created with sequence order values of "1" for leaf node 305, "2" for leaf node 304, "3" for leaf node 302, "4" for leaf node 303, and "5" for leaf node 322.

A splitting process can be used to create new root nodes from a prior existing root node to accommodate the insertion of a new context node into the graph-like data structure. For example, the addition of a new context node for the sequence "mates" in graph-like data structure 320 may result in a splitting operation as is shown in graph 330' instead of simple insertion. In this example, the subsequence "te" is found to appear in both feature index sets for "team" and "mate". A new root node (332) is created by splitting leaf nodes 302 and 303 from root node 301. The links from the new root node (332) and leaf nodes 302 and 303 have sequence order values of "1" and "2", respectively. A link is then created from context node 301 to the new root node and the pointer values are updated for context node 301 so that the link to the new root node has an sequence order value of "1", and the links to leaf nodes 304 and 305 have sequence order values of "2" and "3", respectively. T he new context node (331) for "mates" is then added to the data structure with links to the new root node (332) and leaf nodes 304, 305 and 322 with sequence order values of "3", "2", "1" and "4" respectively.

FIG. 3C is a graphical diagram illustrating the generation of another quantum indexed graph-like data structure in accordance with at least some features of the present disclosure. For the examples described for FIG. 2C, a minimum sequence length of two is imposed on the feature indexes.

As illustrated in FIG. 3C, an example sequence can be processed to form a graph-like data structure (340) that includes a root node (341) that clusters together a set of leaf nodes (342-345). Root node 341 is a context node that serves as an index into the character sequence "teams". Leaf node 342 includes a feature index pair "t,e"; while leaf nodes 343-345 each include a feature index for feature index pairs "e,a"; "a,m"; and "m,s"; respectively. Each of the leaf nodes (342-345) is again linked to a root node (341) with a pointer that includes a label that designates the sequence order value that each leaf node occurs in the ordered sequence. For example, leaf node 342 includes a label "0" to indicate that the feature index pair "t,e" occurs first in the sequence for root node 341. Similarly, labels "1", "2" and "3" each designate the ordering of leaf nodes 343, 344 and 345, respectively. Root node 341 is also a context node as is designated by the asterisk.

A second graph-like data structure (350) is formed with the addition of a new context node (251) for the sequence "mate" to the first graph-like data structure (340). The sequence for the new context node (351) is divided into sequence pairs "m,a"; "a,t"; and "t,e". Since sequence pair "t,e" is already found in the prior existing data structure as leaf node 342, there is no need to create a new leaf node, and the existing leaf node 342 is reused. New leaf nodes 352 and 353 are created for sequence pairs "m,a" and "a,t", respectively since these sequence pairs have not previously occurred in the data structure. Context node 351 is linked to the leaf nodes with ordered values of "0" for leaf node 352, "1" for leaf node 353, "2" for leaf node 342.

A third graph-like data structure (360) is formed with the addition of a new context node (361) for the sequence "teammate" to the second graph-like data structure (350). The sequence for context node 361 is divided into sequence pairs "t,e"; "e,a"; "a,m"; "m,m"; "m,a"; "a,t" and "t,e". Since the sequence pairs "t,e"; "e,a" and "a,m" are already found below context node 341 as a complete ordered sub-sequence, the sub-sequence can be split from the original context node (341) into a new root node (362) with leaf nodes 342, 343 and 345. Root node 362 is linked with an ordered value of "0" to leaf node 342, "1" to leaf node 343, and "2" to leaf node 345. Links from context node 341 are also updated so that context node 341 is linked with an ordered value of "0" to root node 362, and "1" to leaf node 345. Since the sub-sequence pairs "m,a"; "a,t" and "t,e" are already found below root node 351 in their entirety, context node 351 is simply linked to context node 361. A new leaf node for sequence pair "m,m" is created as leaf node 363. Links from context node 361 have ordered values of "0" to root node 362, "1" to leaf node 363, and "2" to context node 351.

It is important to recognize that the "context" nodes (i.e., those marked with asterisks) consist entirely of the references they hold. This means that "*mate", "*team", and "*teammate" in the above example exist entirely based on shared/common sequence references. Each context node also includes an association (e.g., a pointer) with content. For example, a "context node" can be associated with additional information such as a pointer to the original digitized sound recording for a recorded audio steam (e.g., a "wav" file), a time or date stamp for the audio stream, or anything else that is relevant to the underlying data (i.e., in this example the digital data for the audio stream).

Because of data structures form, an associative memory model is suitable to express the relationship between the context nodes set of feature indexes as an index to the associated stored content. Only one physical storage location is required to store the content associated with a context node. Interestingly, the network of root nodes, context nodes and leaf nodes can also serve as a form of neural network where connections between the nodes are dynamically formed based on the sequenced patterns of feature indexes that are evaluated when context nodes are created.

Example Operational Flows for Creating Data Structures

Figure 4A:
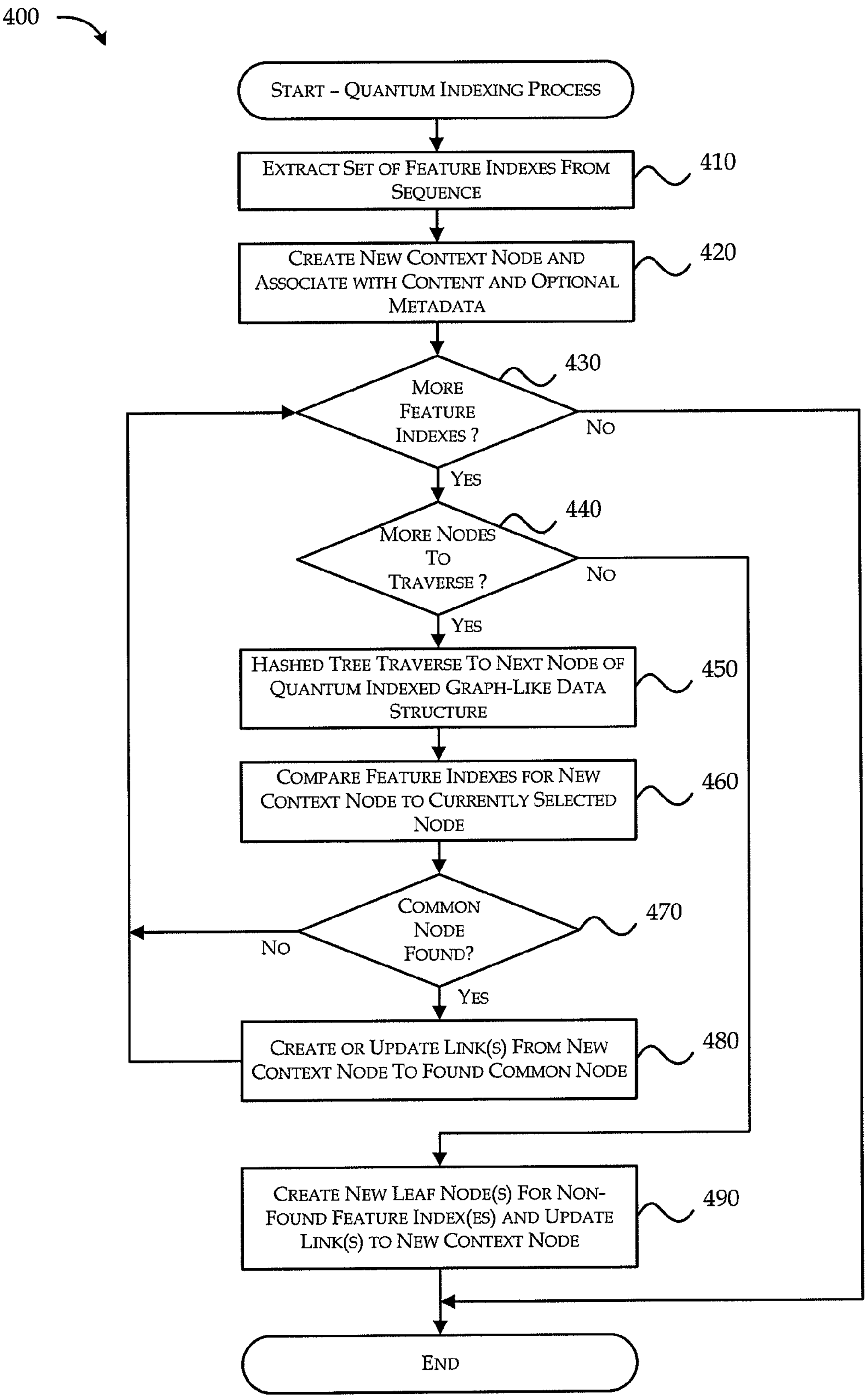
FIGS. 4A-4B are flow diagrams illustrating example operational processes for generating quantum indexed graph-like data structures.
Figure 4B:
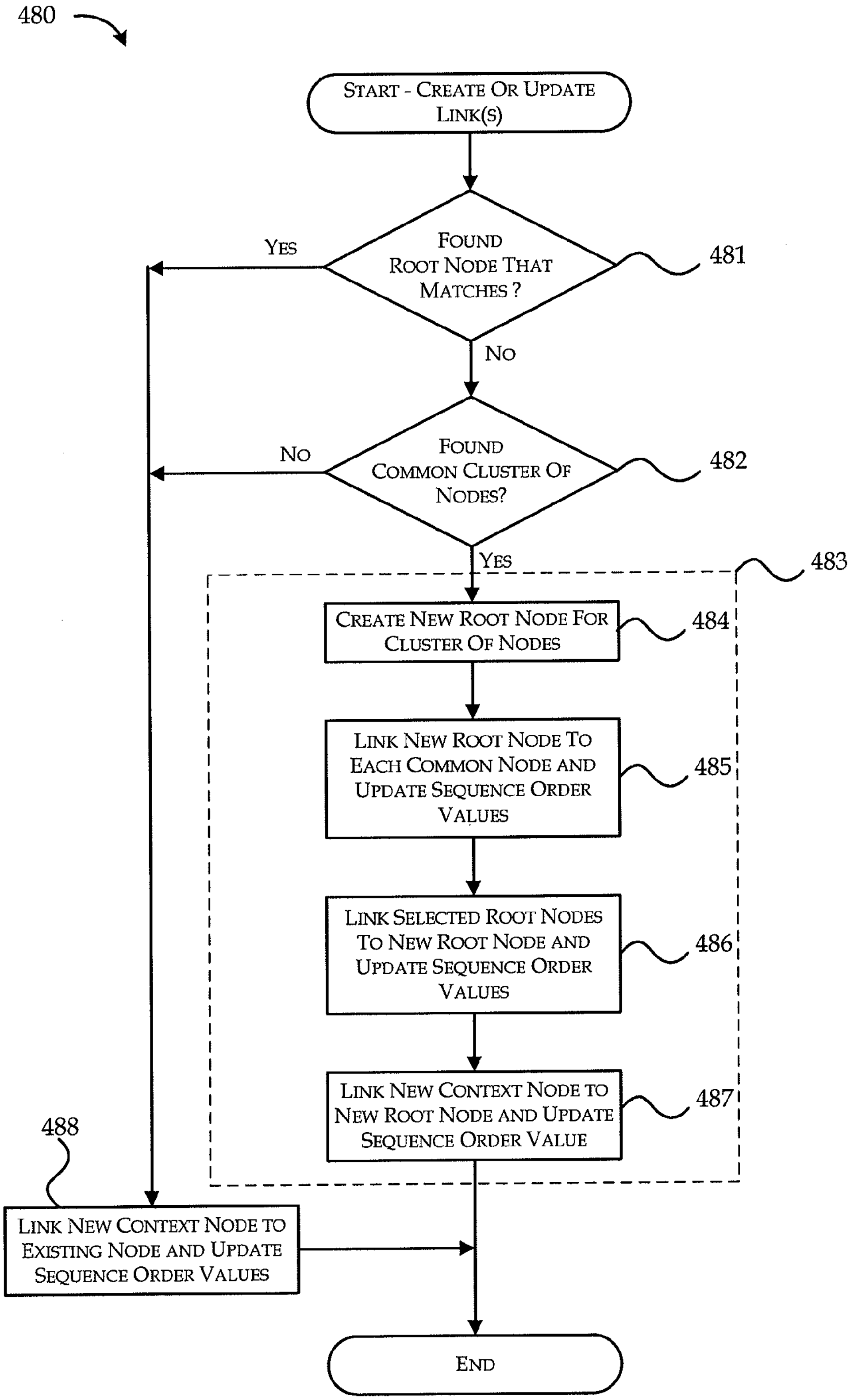

FIGS. 4A-4B are flow diagrams illustrating operational processes for generating quantum indexed graph-like data structures in accordance with at least some features of the present disclosure.

FIG. 4A illustrates a process flow for an example quantum indexing process (400), while FIG. 4B illustrates a process flow for an example process (480) for creating and updating links.

Processing for the quantum indexing process begins at block 410, where a set of feature indexes are extracted from a sequence such as a from a feature index stream (e.g., See 104 in FIG. 1). In some examples, the sequence can be divided into subsequences that are each processed separately. For example, a sequence may correspond to a data stream from an utterance, where the sequence can be divided into subsequences at each delimiter point in the data stream where silence (i.e., dead space in the sound based on the feature index for silence) is detected. In other examples, a data sequence can be divided into a subsequence based on some other selected delimiter (e.g., a specific character or a specific numerical value identified for a feature index in the sequence). In still other examples, a data sequence can be divided into a subsequence based on some other rule based criteria (e.g., identification of a local maxima, a local minima, a maximum sequence length, etc.). Processing flows from block 410 to block 420.

At block 420, a new context node is created for the selected set of feature indexes and an association is created between content and the new context node. The content corresponds to some form of data such as an input signal that is converted into a feature index stream such as, for example, the time domain data (e.g., see 102 in FIG. 1) that can result in the feature index stream of block 410. In one example, the content corresponds to a data stream such as from a digitally encoded: audio signal, video signal or photographic image. In other examples, the content may correspond to a web page, a stored document for an application program (e.g., a word processing document, a spreadsheet document, etc.) or some other form of data. Optionally, there may also be an association created between the new context node and other data or metadata that is associated with the content. Examples of metadata may include a time stamp for the content, a date stamp for the content, a website address associated with the content, a file size for the content, a file name for the content, a file storage path for the content, or any other desired information about the content that may be useful.

Processing continues from block 420 to decision block 430, where the process determines if there are more feature indexes for the new context node that have not been processed. When all of the feature indexes have been processed, processing is terminated. Otherwise, when additional feature indexes need to be processed, processing flows from decision block 430 to decision block 440. A feature index (or a leaf node consisting of a sequence of feature indexes in the case where a minimum sequence length is imposed) can be considered processed once it is found within the existing data structure.

At decision block 440, the process determines if there are nodes in the graph-like data structure that can be traversed for comparison to the feature indexes for the new context node. When additional nodes that have not been traversed exist, processing flows from decision block 450 to block 450. Otherwise, when no additional nodes exist that have not been traversed, processing flows from decision block 440 to block 490.

At block 450, the processing advances to the next node in the quantum indexed graph-like data structure by traversing through the nodes of the data structure and selecting the traversed node as the currently selected node. In some examples, the tree structure utilizes a hashing process to identify the specific nodes for traversal (e.g., see discussion for FIG. 10). Processing flows from block 450 to block 460.

At block 460, the process compares the feature indexes for the sequence associated with the new context node to the feature indexes associated with the currently selected node so that common nodes can be identified. Common nodes are those nodes that include one or more feature indexes associated with the sequence either as leaf nodes or as clusters of leaf nodes with a common root node. In some instances, a common root node may also be a context node.

At decision block 470, the system determines if any common nodes have been identified. Processing continues from decision block 470 to block 480 when one or more common nodes are found. Otherwise processing continues from decision block 470 to decision block 430 when no common nodes are found.

At block 480, one or more links are created between the new context node that was created at block 420 and the common nodes that were identified by traversing through the data structure. Each link can be implemented as a pointer to the common node along with a sequence order value that indicates the position of the feature indexes referenced by the common node within the sequence described at block 410. This process block may also include splitting operations so that node clusters from a common node can be split into a new root node or a new context node depending upon what is needed. When a splitting operation is performed by the process, the links to all other effected nodes are also updated so that they properly reference the split node, and so that the sequence order values are properly updated to reflect the split node. Processing flows from block 480 to block 430.

At block 490, one or more new leaf nodes are created for any remaining feature indexes that have not been found upon completion of the traversal of the quantum indexed graph-like data structure. The leaf nodes are either mapped one-to-one with a single feature index, or they can be mapped to multiple feature indexes occurring in a sequence according to a minimum sequence length (e.g., a minimum sequence length of two features, three features, etc.) as previously described. Links are created between the new context node created at block 420 and the newly created leaf nodes. Each link includes a sequence order value so that the order that the leaf node occur in the originally extracted sequence relative to the new context node is preserved. Processing terminates after block 490.

FIG. 4B is a flow diagram illustrating an operational flow (480) for creating or updating one or more links from a new context node to common nodes that are found in a quantum indexed graph-like data structure in accordance with at least some features of the present disclosure. Processing begins at decision block 481.

At decision block 481, the process determines if the found node is a root node where all of the leaf nodes associated with the selected root node in the graph-like data structure match the sequence of feature indexes (or the relevant portion thereof) for the new context node (i.e., see 420 of FIG. 4A where the new context node is created to map a set of feature indexes that occur in an ordered sequence to content). When the feature indexes associated with the found root node matches the feature indexes of the new context node in the same sequencing order, then processing continues from decision block 481 to block 488. Otherwise, when either the selected node is not a root node or when the selected node is a root node where not all leaf nodes match, processing flows from decision block 481 to decision block 482.

At decision block 482, the process determines if a common cluster of nodes is found for the selected node from the quantized indexed graph-like data structure. A cluster of nodes matches when all of the feature indexes identified by the cluster occur in the same sequenced order as the sequence (or the relevant portion thereof) for the new context node. When a common cluster of nodes is found, processing continues from decision block 482 to block 483 where the cluster of nodes is split-off from the selected root node. Otherwise the selected node is a single leaf node and processing continues from decision block 482 to block 488.

A splitting operation (483) is illustrated by processing blocks 484-487. At block 483 a new root node is created for the cluster of nodes so that the common nodes found at the selected node can be split-off from the selected node. Processing flows from block 483 to block 484.

At block 484, links are created from the new root node to each common node that has been identified as matching in the same sequence order as the feature indexes of the new context node. Sequence order values are updated for each link for the new root node to reflect the proper sequence order for the feature indexes. Processing continues from block 484 to block 485.

At block 485, links are created from the selected root node and the new root node so that the links between the selected root node and the common nodes can be severed without losing the overall sequence. The sequence order values for the effected links at the selected common node are updates to reflect the proper sequence order. Processing continues from block 485 to block 486.

At block 486, a link is created from the new context node (e.g., the new context node created at block 420 in FIG. 4A) and the new root node and the sequence order value for the link is updated so that the processing for matching feature indexes is completed.

At block 487, a link is created from the new context node to the selected node (e.g., the selected node from block 450 of FIG. 4A) and the sequence order value for he link is updated so that processing for the matching feature indexes is completed.

Example Operational Flow for Query Process

Figure 5:
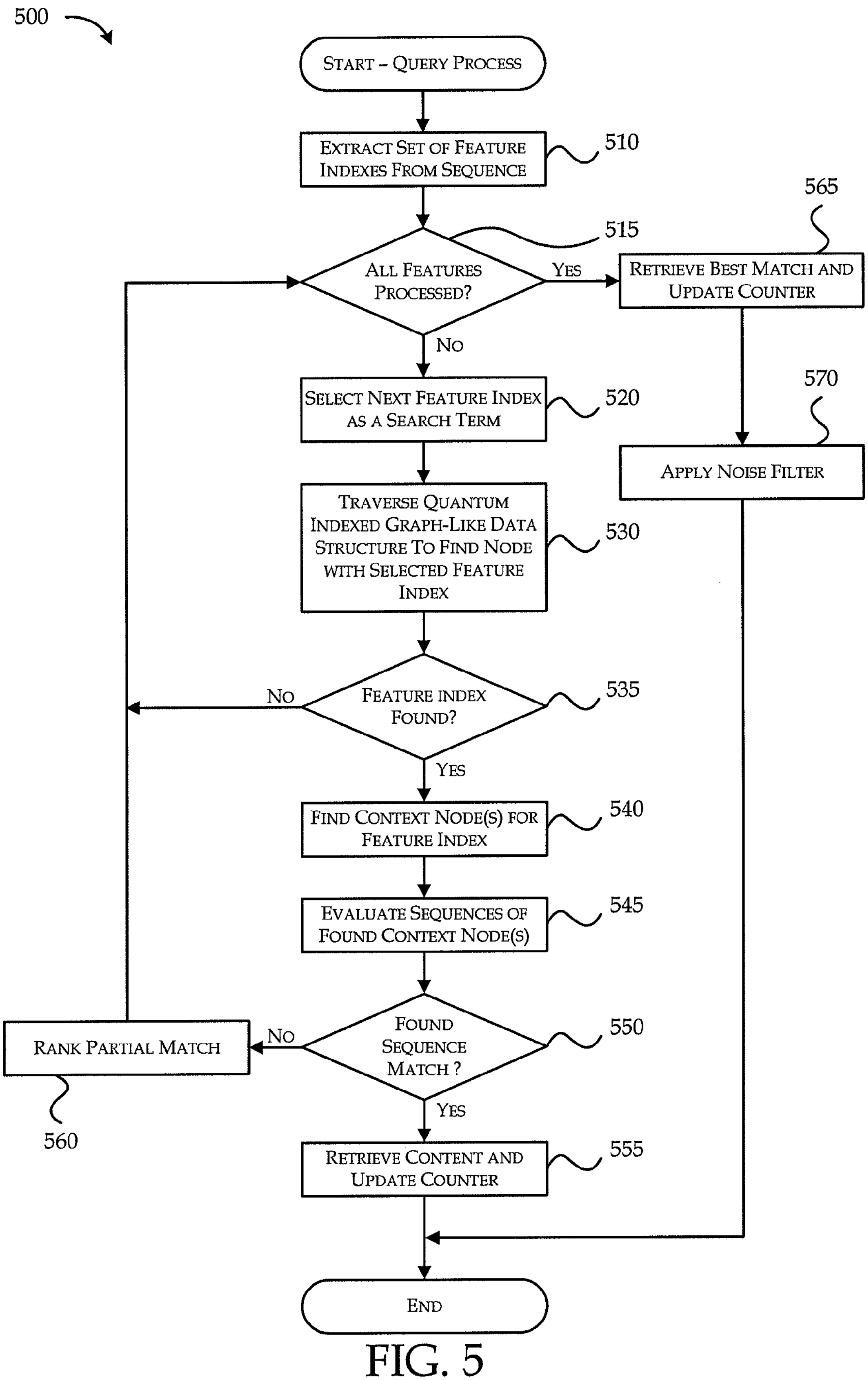
FIG. 5 is a flow diagram illustrating an example operational process for querying and locating content associated with a quantum indexed graph-like data structure.

FIG. 5 is a flow diagram illustrating the operational process (500) for querying and locating content associated with a quantum indexed graph-like data structure in accordance with the present disclosure. The query process is similar to the quantum indexing processes described previously with respect to FIGS. 4A and 4B, except that no new nodes are created.

Processing begins at block 510, where a set of feature indexes are extracted from a sequence such as a from a feature index stream (e.g., See 104 in FIG. 1). In some examples, the sequence can be divided into subsequences that are each processed separately as previously described. After the set of feature indexes from the sequence are identified, processing continues to decision block 515.

At decision block 515, the process determines if all of the identified feature indexes have been processed. Feature indexes are considered processed when either the entire data structure has been traversed without locating the feature index, or when the feature index is located within the data structure. When additional feature indexes are to be processed, processing flows from decision block 515 to block 520. Otherwise, if all feature indexes have been processed without finding an exact match of all features in the ordered sequence, then processing flows to block 565.

At block 520, the next feature index from the sequence in the set of feature indexes is selected as a search term. Processing then continues to block 530, where the quantum indexed graph-like data structure is traversed to locate a node that includes the selected feature index. The traversal can be conducted in any reasonable method such as by selecting each context node in turn and traversing to the leaf nodes to determine if any leaf nodes match the currently selected feature index. In some other examples, the tree traversal can be accomplished using a hashing function that maps to nodes in the data-structure. Processing then continues to decision block 535.

At decision block 535, the process determines if the currently selected feature index is found from the traversal through the quantum indexed graph-like data structure. When the currently selected feature index is found (or the sequence of feature indexes when a minimum sequence length is imposed on leaf nodes), processing continues from decision block 535 to block 540. Otherwise, when the currently selected feature index is not found in the data structure, processing flows from decision block 535 to decision block 515.

At block 540, one or more context nodes (which are root nodes with an associated content) are found for the currently selected feature index (or indexes for minimum length sequences) by traversing back through the data structure to all root nodes that reference the feature index that was found at the leaf node. Continuing to block 545, each of the found context nodes are evaluated to determine if any of the found context nodes have a matching sequence of feature indexes. For example, one context node may have a leaf node that matches the currently selected feature index (which may actually be a sequence of feature indexes for the case where a minimum sequence length imposed on leaf nodes) even though the sequence that is clustered by the context node does not match as a whole. In another example, a context node may have a leaf node that matches the currently selected feature index along with a match for only a portion of the sequence formed by the set of feature indexes. A complete match is only found when the entire set of feature indexes in the proper sequence order matches the feature indexes that are clustered in common to a context node. Processing continues from block 545 to decision block 550.

At decision block 550, the process determines if a sequence match was found during the evaluation of block 545. Processing flows from decision block 550 to block 555 when a sequence match is found. Otherwise, processing continues from decision block 550 to block 560 when an incomplete match is found At block 555, the stored content and/or associated data or metadata that is associated with the stored content can be retrieved since a matching sequence was identified at a context node. In some instances, a counter can be incremented to indicate that the content has been accessed. Also, metadata associated with the content can be updated to indicate a time and/or date of retrieval of the content.

At block 560, a partial match is identified from the sequence since the feature index was found without a matching context node. This situation can occur when the set of feature indexes that were employed as the search terms do not exactly match the original set of features that are associated with the stored content. For example, an index may map the sequence “teams” to stored content, while the query may only include the search term “team”. In such an example, it may be desirable to track the partial matches and rank them at block 560 in an order to determine a most likely match. The ranking or scoring can be accomplished by any reasonable method such as, for example, a heuristic scoring. Processing flows from block 560 to decision block 565 so that additional feature indexes can be evaluated.

Block 565 is an optional block that can be used to process partial matches in the case where all feature indexes are processed without finding a sequence that matches the query (or all minimum sequences of feature indexes in the case where minimum sequences are imposed). In some examples, the best matches are provided as a list of most likely matches similar to web-search result. In some other examples, the content for the best match is retrieved and a counter can be incremented or some other metadata can be updated to reflect the access to the content. Processing can optionally flow to block 570, where a noise filtering function can be applied to the matches. After block 570, processing terminates.

The ranking of the query results can be determined based on any variety of mathematical, probability and/or statistical models. For example, a sequence may includes a set of three feature indexes, where the first two feature indexes are matched to a context node yielding a ranking of 66% since two out of the three feature indexes matched in the proper sequence order. In another example, the first and third feature indexes appear in the proper order without the second feature index in the set yielding a ranking of less than 66% since the missing term reduces the probability that a successful match has to the sequence has been found. Once all of the feature indexes have been searched, the overall ranking of the partial matches can be evaluated to find the most likely match for retrieval of content.

Pattern Promotion

Figure 6:
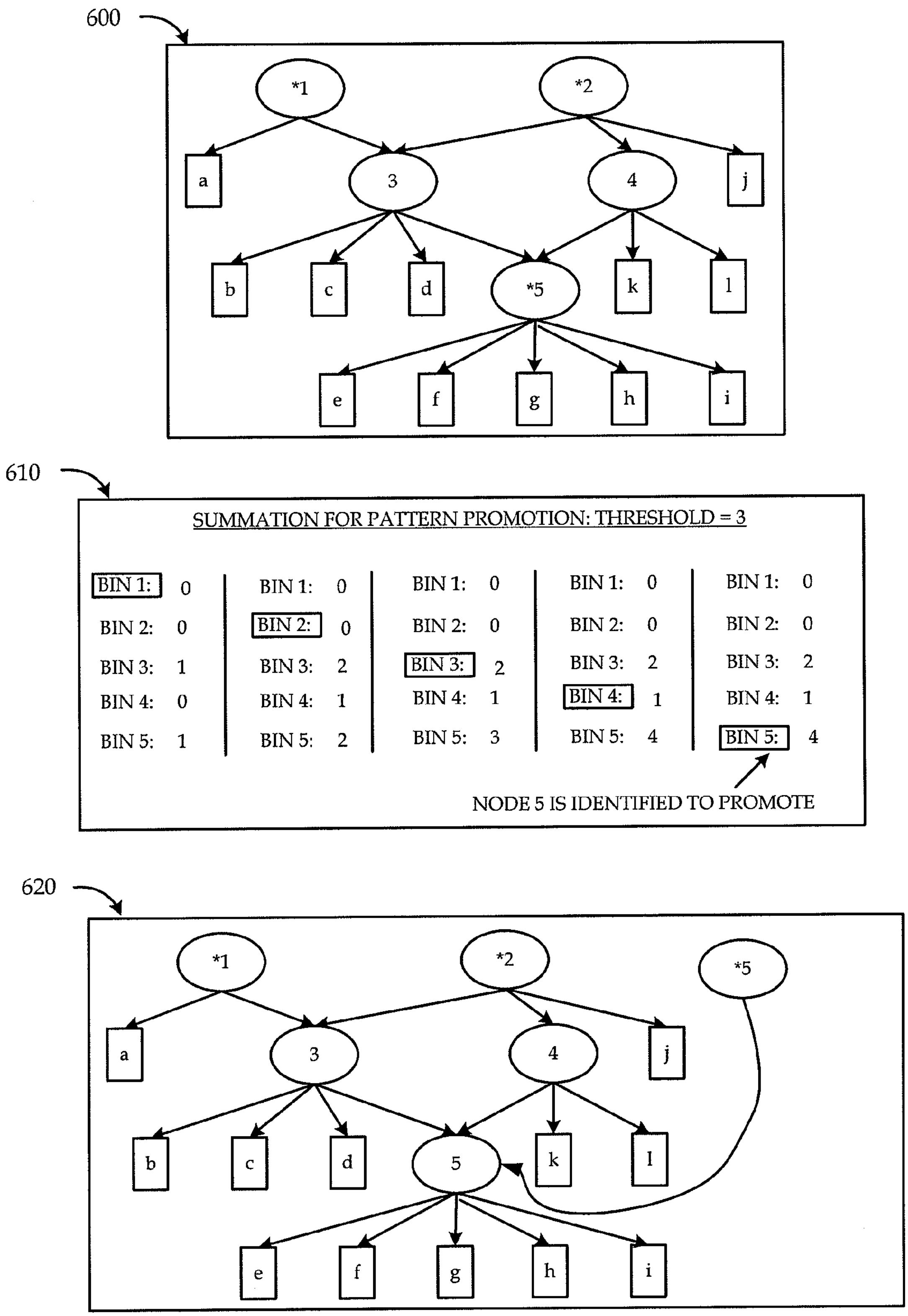
FIG. 6 is a graphical diagram illustrating an example pattern promotion process for a quantum indexed graph-like data structure.

FIG. 6 is a graphical diagram illustrating an example pattern promotion process for a quantum indexed graph-like data structure in accordance with the present disclosure.

As shown in FIG. 6, a graph like data structure (600) includes 5 root nodes numbered 1 through 5. Root nodes 1, 2 and 5 each include an asterisk to indicate that they are also context nodes. Context node 1 is linked to a leaf node “a” and root node 3. Context node 2 is linked to root nodes 3 and 4, and also to leaf node “j”. Root node 3 is linked to leaf nodes “b”, “c”, “d”, and context node 5. Root node 4 is linked to root node 5 and leaf nodes “k” and “l”. Context node 5 includes leaf nodes “e”, “f”, “g”, “h” and “i”.

In one example, a pattern promotion process can be implemented to track the frequency of use associated with a context node so that the most used context nodes are pushed to the top of the data structure. For example, a counter can be associated with each of the context nodes (1, 2 and 5). Each time the content is accessed at those context nodes the counter is incremented. When the counter exceeds some threshold value, the context node should be evaluated and moved, if necessary, to the top level of the data structure. Other schemes can also be imposed such as tagging the content with metadata that similarly tracks the frequency of used (e.g., a metadata variable that increments like a counter value, a metadata value for a time-date stamp upon date of access, etc.).

Another process can also be used such as a cleanup or bookkeeping process that evaluates the data structure itself. For example, a summation process (610) can be used in a manner similar to a histogram process to identify critical root nodes in the data structure. A counter bin can be created for each root node and initialized to values of "0","0","0","0" and "0", respectively. The structure is traversed from each root node and a counter is incremented for only those root nodes that are traversed. For example, starting at the first root node (1), only root nodes 3 and 5 are traversed and the counter bins are incremented to values of "0","0","1","0" and "1", respectively. Advancing to the second root node (2), only root nodes 3, 4 and 5 are traversed and the counter bins are incremented to values of "0","0","2","1" and "2", respectively. Proceeding on to the third root node (3), only root node 5 is traversed and the counter bins are incremented to values of "0","0","2","1" and "3", respectively. Continuing on to the fourth root node (4), only root node 5 is traversed and the counter bins are incremented to values of "0","0","2","1" and "4", respectively. Lastly, proceeding to the fifth root node (5), no other root nodes are traversed and thus none of the counter bins are incremented and the final counter bin values are "0","0","2","1" and "4", respectively. When a threshold of "3" is utilized, the only root node that exceeds the threshold is root node 5. Since root node 5 is a context node, the data structure can benefit from including the index at the top most level, and node 5 is replaced with a root node and a new root node is established at the top level of the data structure as is illustrated by graph 620.

Figure 7A:
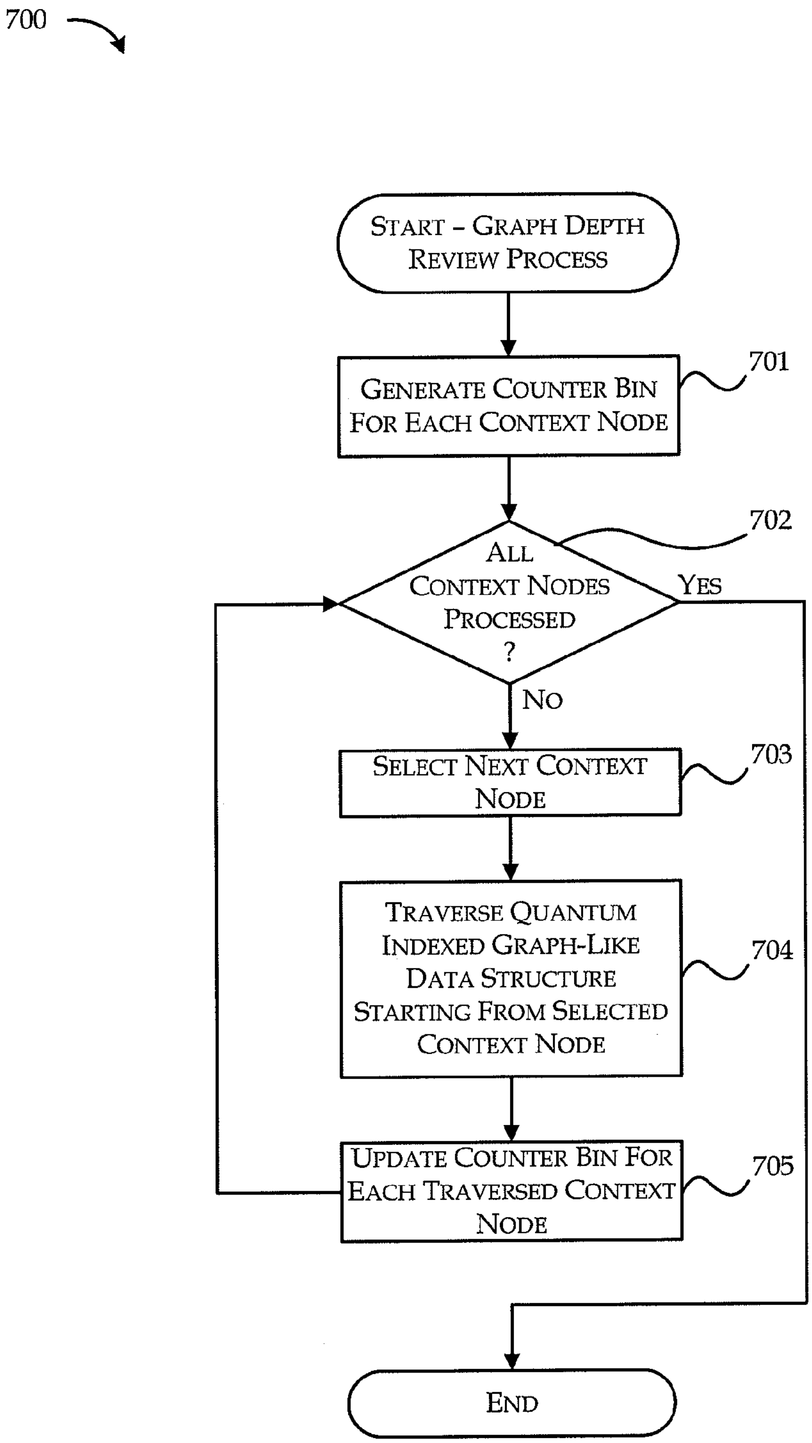
FIGS. 7A-7B are flow diagrams illustrating operational processes for an example pattern promotion methodology for a quantum indexed graph-like data structure.
Figure 7B:
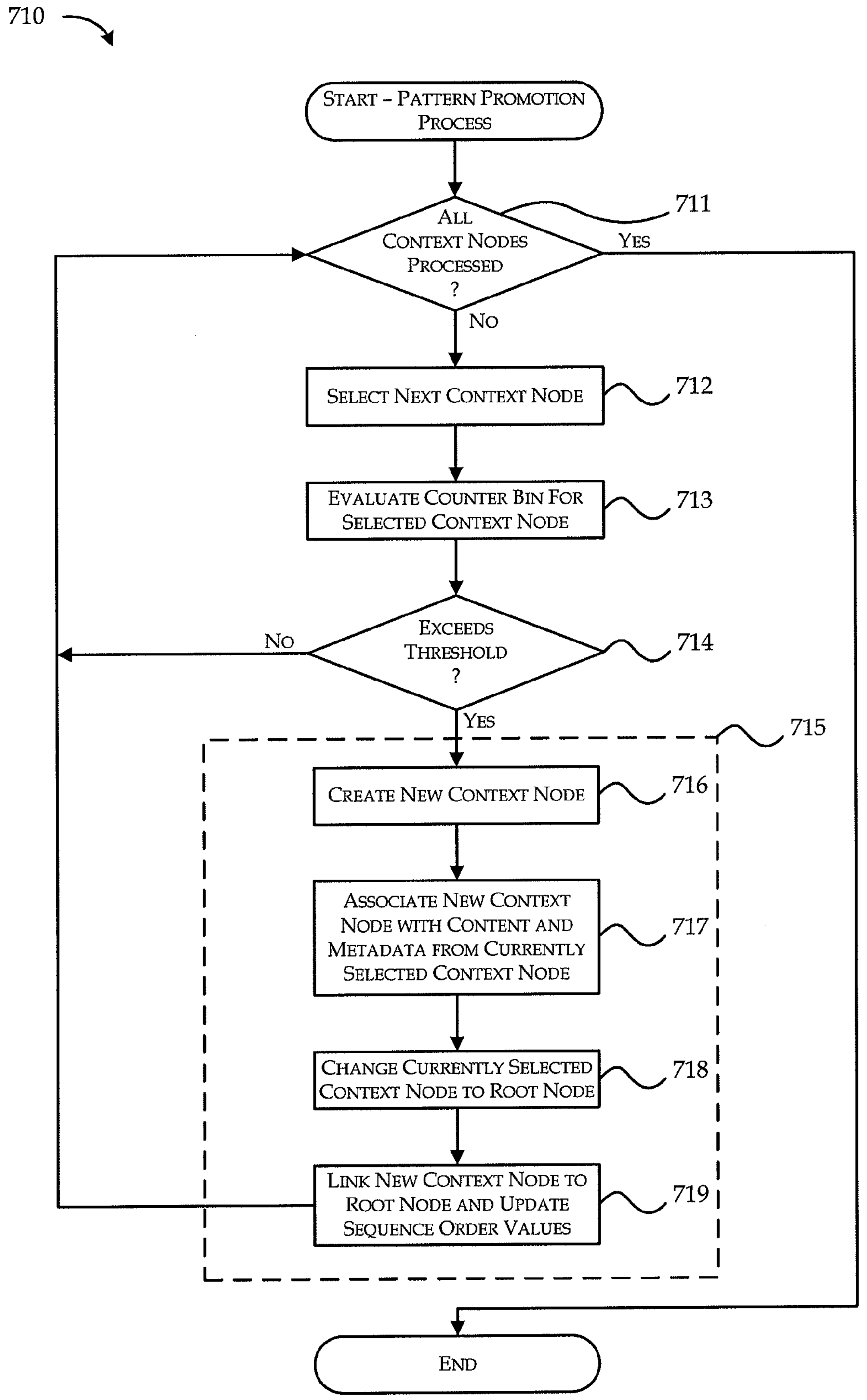

FIGS. 7A-7B are flow diagrams illustrating operational processes for example pattern promotion methodologies for a quantum indexed graph-like data structure; all arranged in accordance with at least some features of the present disclosure.

Flow diagram 700 in FIG. 7A illustrates an example review process that explores the depth of the graph in substantially the same way as described for summation process 610 of FIG. 6.

Processing begins at block 701 where a counter bin is initialized for each context node. Alternatively the counter bins can be used for each root node so that the nodes can be analyzed for garbage removal, pattern promotion, merging, splitting, and other similar bookkeeping operations. Processing flows from block 701 to decision block 702.

At decision block 702 the process to determine if all of the context nodes have been processed. A context node is processed if the data structure has been traversed using the selected context node as a starting point. When additional context nodes are to be processed, processing flows from decision block 702 to block 703. When all of the context nodes have been processed, processing is terminated.

At block 703, the next context node is selected as the starting point in a traversal process. Continuing to block 704, the quantum indexed graph-like data structure is traversed from the selected context node. At block 705, each counter bin for a traversed context node is incremented. Processing returns from block 705 to decision block 702.

Flow diagram 710 in FIG. 7B illustrates an example pattern promotion process that examines the frequency of use for context node to determine if the context node should be promoted.

Processing begins at decision block 711 which evaluates if all of the context nodes have been processed. Context nodes are determined to have been processed once evaluated for pattern promotion. When addition context nodes are to be processed, processing flows from decision block 711 to block 712. When all context nodes have been processed processing is terminated.

At block 712 the next context node that has not been processed is selected. Continuing to block 713, the counter bin for the selected context node is evaluated to determine if the context node has exceeded the requisite threshold for pattern promotion. Processing flows from decision block 714 to decision block 711 when the threshold has not been exceeded for the currently selected context node. Otherwise, processing flows from decision block 714 to block 715 when the threshold has been exceeded for the currently selected context node.

Block 715 is a process for promoting the selected context node, which includes blocks 716-719. At block 716 a new context node is created. At block 717 the content and any relevant data and/or metadata associated with the currently selected context node are associated with the new context node. Continuing to block 718, the current selected context node is changed to a root node by severing the association with the content and associated metadata. At block 719, the new context node is linked to the root node that was formerly the context node and sequence order values for the link are initialized. Processing returns from block 719 to decision block 711.

Example Operational Flow for Another Query Process

Figure 8:
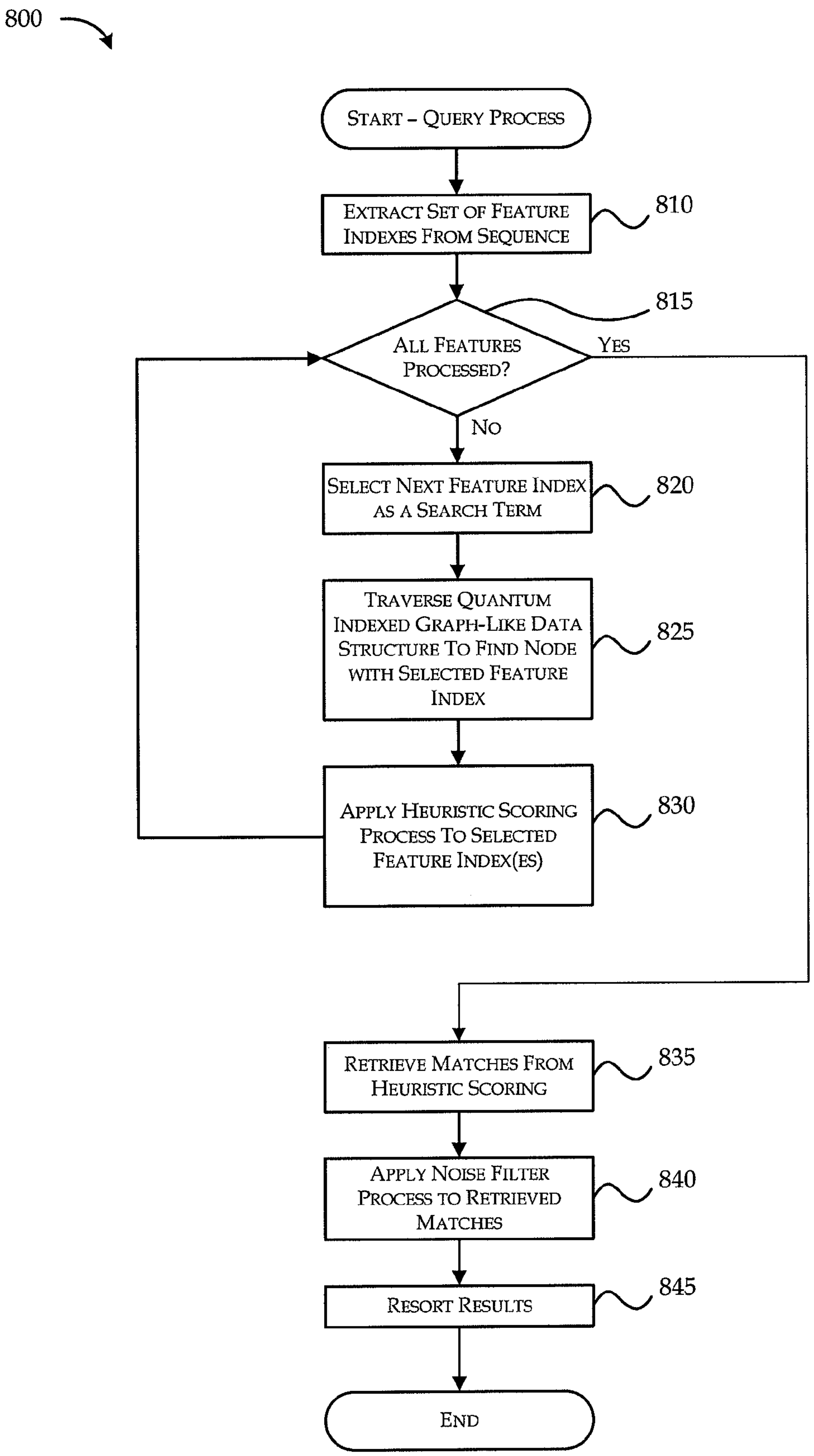
FIG. 8 is a flow diagram illustrating another example operational process for handling queries.

FIG. 8 is a flow diagram illustrating another example operational process (800) for handling queries and locating content associated with a quantum indexed graph-like data structure in accordance some aspects of the present disclosure. The query process is similar to the quantum indexing processes described previously with respect to FIG. 5.

Processing begins at block 810, where a set of feature indexes are extracted from a sequence such as a from a feature index stream (e.g., See 104 in FIG. 1). In some examples, the sequence can be divided into subsequences that are each processed separately as previously described. After the set of feature indexes from the sequence are identified, processing continues to decision block 815.

At decision block 815, the process determines if all of the identified feature indexes have been processed. Feature indexes are considered processed when either the feature index is located within the graph-like data structure or when it is determined that the feature index is not found in the graph-like data structure. When additional feature indexes are to be processed, processing flows from decision block 815 to block 820. Otherwise, if all feature indexes have been processed then processing flows to block 835.

At block 820, the next feature index from the sequence in the set of feature indexes is selected as a search term. Processing then continues to block 825, where the quantum indexed graph-like data structure is traversed to locate a node that includes the selected feature index. The traversal can be conducted in any reasonable method such as by selecting each context node in turn and traversing to the leaf nodes to determine if any leaf nodes match the currently selected feature index. In some other examples, the tree traversal can be accomplished using a hashing function that maps to nodes in the data-structure to codes. Processing then continues to block 830, where a scoring or ranking process can be applied based on the selected feature indexes and any matches or partial matches that are found. The scoring or ranking process can be a heuristic process, or any other reasonable methodology. Processing flows from block 830 to decision block 815.

Processing flows from block 815 to block 835 once all of the feature indexes from the query are processed. At block 835, the rank or score (e.g., a heuristic score) associated with the matches and/or partial matches are retrieved for analysis. Processing continues to block 840 where a noise filter function can optionally be applied to the retrieved matches. In some examples, the filtering function offsets the overall rank or score based on various mathematical models. In other examples, the filtering function can discard some matches completely. After the filtering is completed, the results can optionally be resorted at block 845 so that the best matches appear first. Processing terminates after block 845.

Example Heuristic Scoring Process

Figure 9:
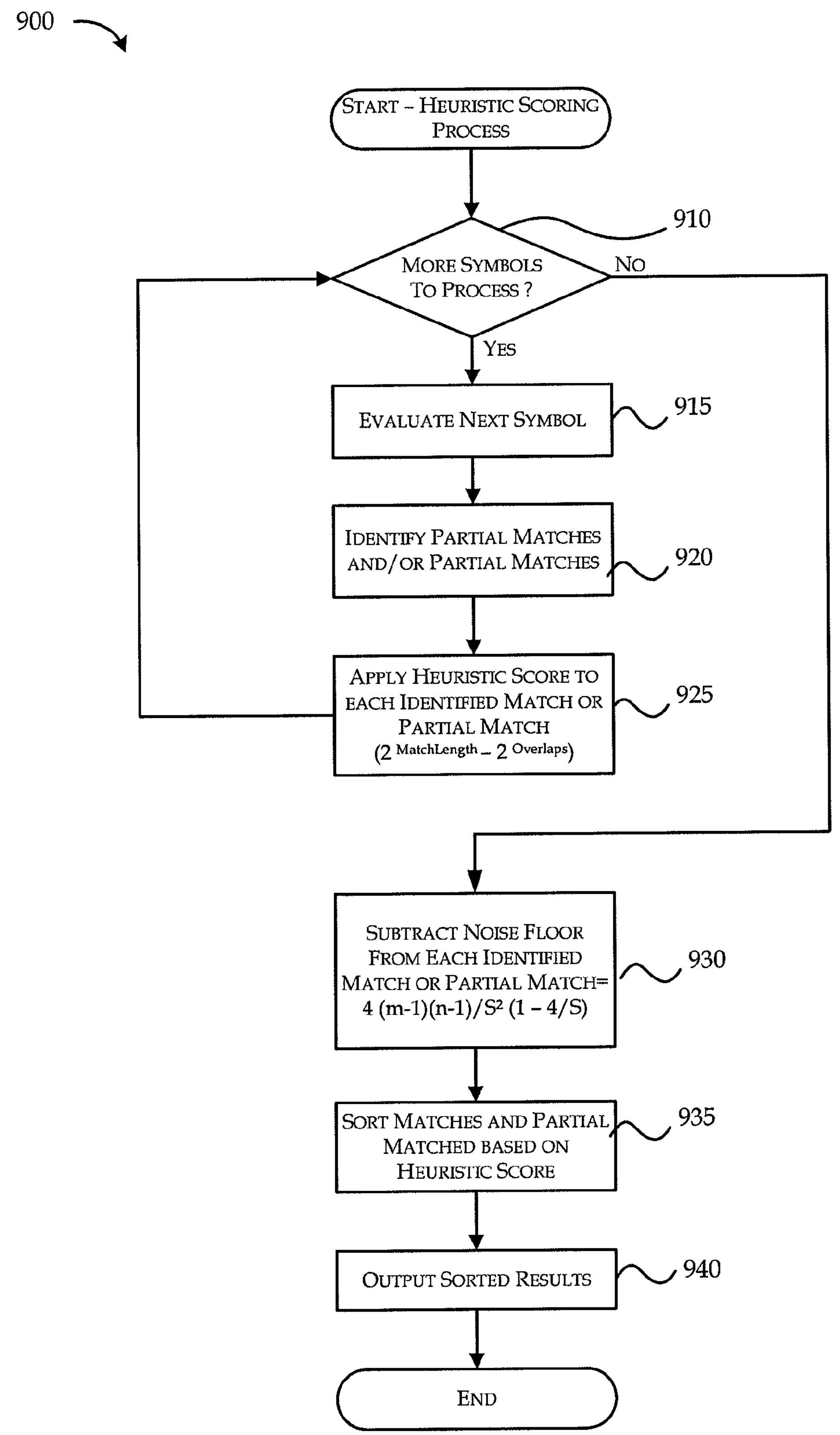
FIG. 9 is a flow diagram illustrating an example operational process for heuristic scoring.

FIG. 9 is a flow diagram illustrating an example operational process (900) for heuristic scoring in accordance with at least some features of the present disclosure. Heuristic scoring can combat noise and provide an approximate solution to a query that does not have an exact solution. Subsequences of a sequence can be heuristically matched in such a way that duplicate matches are discounted and out of order query terms can be considered.

The heuristic scoring process can be applied to selected feature indexes such as symbols in the case of an alphabet-type processing method. After the set of selected symbols are identified (e.g. graph traversal block 825 from FIG. 8), processing flows to decision block 910. At decision block 910 the process determines if additional symbols are to be processed. When additional symbols are to be processed, processing flows from decision block 910 to block 915. Otherwise processing flows to block 930.

At decision block 915 the next symbol is selected and evaluated. Processing continues to block 920 where any partial or complete match is determined by comparing the selected symbol or symbols to the currently indexed graph node symbol or symbols (i.e., the minimum feature length can be greater than 1). Processing continues to block 925 where the heuristic score is calculated from the length of the match (MatchLength) and the number of overlaps from other matches (Overlaps). Some example heuristic scoring processes can utilize an exponential function, where heuristic score=$2^{MaxLength}-2^{Overlaps}$. The example exponential function automatically filters out competing matches that are shorter in length due to the exponential curve, and can be computed quickly using bit shift. Processing flows from block 925 to decision block 910 for more processing.

At block 930 an optional noise floor can be subtracted from the rank or score for each of the identified matches or partial matches. The derivation of noise floors is further described below, and a simple noise floor calculation can simply be represented as: score(sequence)=heuristic_score(sequence)−noise_floor. In one example, the noise floor=$[4(m-1)(n-1)]/[S^2(1-4/S)]$, where m=length of the query string, n=the number of indexed feature sets or symbol strings, and S is the size of the alphabet (e.g., the number of baseline features or atomic values available for the feature index stream).

Continuing to block 935, the matches and/or partial matches can be resorted based on their heuristic score, or their offset heuristic score in the case where a noise floor calculation is used. Optionally, the sorted results can be output at block (940) such as via a display or speaker on a computing device, a file, a text stream, or any other reasonable means. Processing terminates after block 940.

Example Hashing Process

Figure 10:
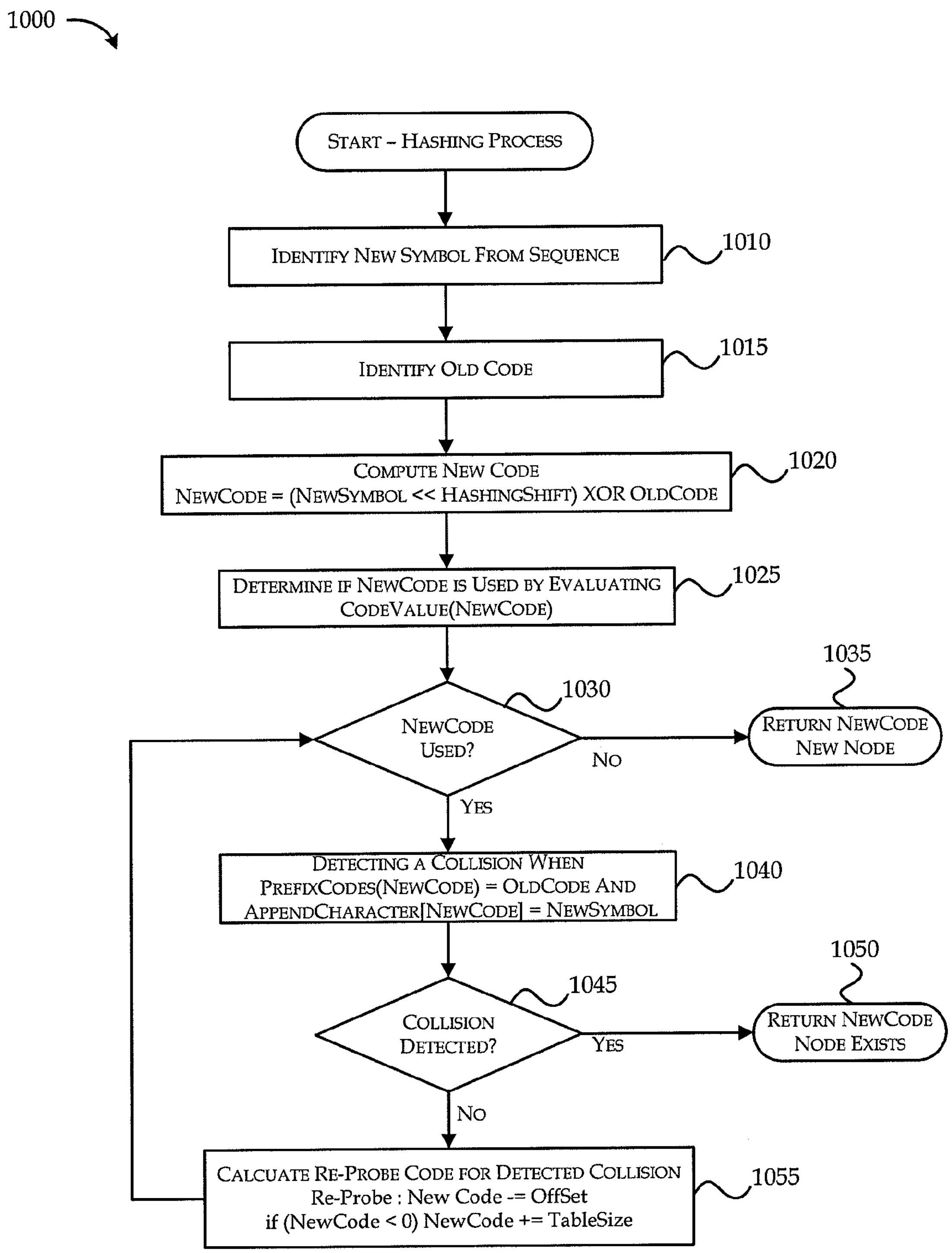
FIG. 10 is a flow diagram illustrating an example operational process for generating hashing codes.

FIG. 10 is a flow diagram illustrating an example operational process (1000) for generating hashing codes in accordance with at least some features of the present disclosure. The hashing process can be used to quickly identify a node in the quantum-indexed graph-like data structure from the incoming symbol stream (e.g., in a query) without requiring a manual search through the data structure.

Symbols from a sequence are identified at block 1010. Processing continues to block 1015 where the preexisting codes in the data structure are identified as old codes. At block 1020 a new code identifier is computed from the new symbol (e.g., a new feature index such as a phoneme index, an alphabetic character, a set of feature indexes according to the minimum atomic value, etc.) by hashing: NewCode=(NewSymbol<<HashingShift)XOR OldCode. Continuing to block 1025, the new code (i.e., NewCode) is evaluated to determine if the new code is already in use. In some examples the NewCode is a used as a seed to a code generator so that the value corresponds to CodeValue(NewCode).

Processing flows from decision block 1030 to block 1035 when the code value is not in use. Otherwise processing flows from decision block 1030 to block 1040 when the code value is already in use. Block 1035 returns the new code as a new node that has never been previously used.

When a collision is detected processing flows to block 1040. At block 1040 the new code is evaluated to determine if a prior existing node is identified as the collision node. An existing node is identified as the collision node when the preceding code (e.g., PrefixCode) for the new code corresponds to an old code (e.g., OldCode) in the data structure and the new symbol corresponds to a succeeding code (Append Character) for the detected code. In other words, matched nodes are identified when (PrefixCodes(NewCode)==OldCode) AND (AppendCharacter(NewCode)==NewSymbol).

Processing flows from decision block 1045 to block 1050 when a matched node collision is detected. Otherwise processing flows from decision block 1045 to block 1055 when a code collision is detected. At block 1050 the new code (i.e., NewCode) is returned as a prior existing node that has been identified as already existing in the graph-like data structure. At block 1055, a re-probe code is calculated since a collision for the new code does not exactly match the prior existing nodes in the already existing graph-like data structure. The re-probe code can be generated by offsetting the new code as: NewCode=NewCode−Offset. If the NewCode value is less than zero, then the code can be offset again based on the size of the table of codes so that NewCode=NewCode+Tablesize. Processing then continues to decision block 1030. The processing of hashing codes will become more apparent from the examples that follow below.

Example Tables Using Hashing Process

Figure 11B:
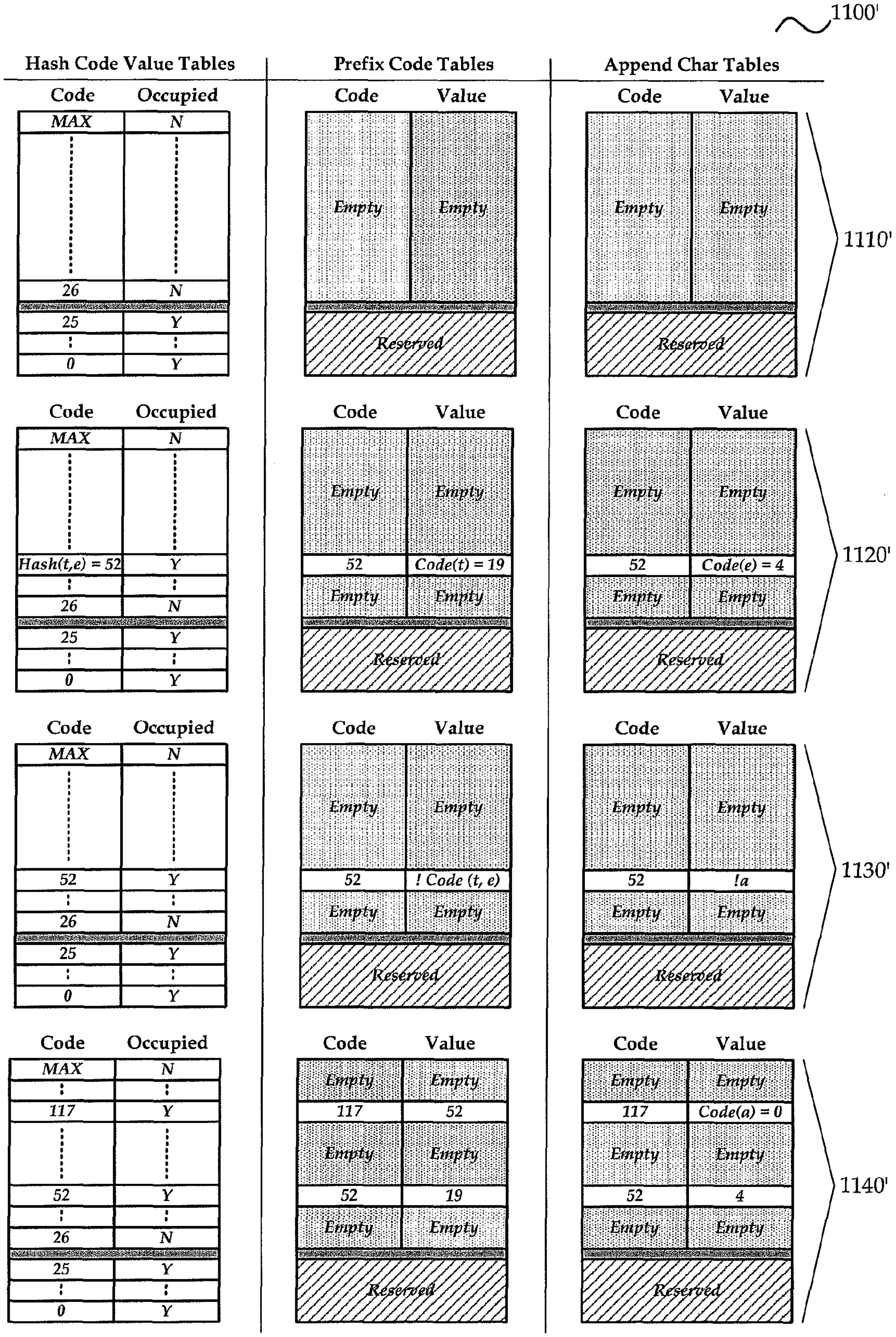

FIGS. 11A-11B are graphical diagrams illustrating example table generation (1100, 1100') using hashing codes in accordance with features of the present disclosure. For the described examples, a feature index stream for the sequence "team" is processed into three sets of tables: Hash Codes, Prefix Codes and Append Characters.

The Hash code table includes a hash code column and a flag column identifying hash codes as occupied or available. The Prefix Code Table includes a Prefix Code column and a Value field column. The Append Char Table includes a Prefix Code column and a Value field column. For the example described herein, codes 0-25 in each table are reserved for baseline feature indexes corresponding to a 26 character alphabet corresponding to letters "a" through "z".

Table set 1100 includes table sets 1110, 1120, 1130 and 1140. Table set 1110 illustrates empty tables, where the only used portion of the tables correspond to the reserved codes (0-25) for baseline feature indexes.

Table set 1120 illustrates the hashing of "t,e" into code 52, which was previously an unoccupied or available code. Code 52 is then marked as occupied in the Hash Table. An entry is also created in the prefix code table at entry 52, where a value of 19 is entered. The value 19 corresponds to the code assigned to letter "t", a baseline feature, which is the first portion of the sequence ("t, e") in the feature index stream. Another entry is also created in the Append Char Table at entry 52, where a value of 4 is entered. The value 4 corresponds to the code assigned to letter "e", a baseline feature, which is the second portion of the sequence ("t, e") in the feature index stream. As described and illustrated a mapping is created between a hash code 52, a prefix code value for "t" and an append code value for "e".

Table set 1130 illustrates the hashing of "a" into code 117, which was previously an unoccupied or available code. Code 117 is then marked as occupied in the Hash Table. An entry is also created in the prefix code table at entry 117, where a value of 52 is entered. The value 52 corresponds to the code assigned to the preceding subsequence "t,e". Another entry is also created in the Append Char Table at entry 117, where a value of 0 is entered. The value 0 corresponds to the code assigned to letter "a", a baseline feature, which is the third portion of the sequence ("t, e, a") in the feature index stream. As described and illustrated a mapping is created between a hash code 117, a prefix code value for "t,e" and an append code value for "a".

Table set 1140 illustrates the hashing of "m" into code 98, which was previously an unoccupied or available code. Code 98 is then marked as occupied in the Hash Table. An entry is also created in the prefix code table at entry 98, where a value of 117 is entered. The value 117 corresponds to the code assigned to the preceding portion of subsequence "t, e, a". Another entry is also created in the Append Char Table at entry 98, where a value of 12 is entered. The value 12 corresponds to the code assigned to letter "m", a baseline feature, which is the last portion of the sequence ("t, e, a, m") in the feature index stream. As described and illustrated a mapping is created between a hash code 98, a prefix code value for "a" and an append code value for "m".

Table set 1100' includes table sets 1110', 1120', 1130' and 1140'. Table set 1110' illustrates empty tables, where the only used portion of the tables correspond to the reserved codes (0-25) for baseline feature indexes.

Table set 1120' illustrates the hashing of "t,e" into code 52, which was previously an unoccupied or available code. Code 52 is then marked as occupied in the Hash Table. An entry is also created in the prefix code table at entry 52, where a value of 19 is entered. The value 19 corresponds to the code assigned to letter "t", a baseline feature, which is the first portion of the sequence ("t, e") in the feature index stream. Another entry is also created in the Append Char Table at entry 52, where a value of 4 is entered. The value 4 corresponds to the code assigned to letter "e", a baseline feature, which is the second portion of the sequence ("t, e") in the feature index stream. As described and illustrated a mapping is created between a hash code 52, a prefix code value for "t" and an append code value for "e".

Table set 1130' illustrates the hashing of "a" into code 52, which is already occupied. Since code 52 is already taken a collision is detected since the prefix and append code tables do not correspond to the codes for "t, e" and "a", respectively. A re-probe code is then calculated using an offset as previously described (e.g., an offset=Table size−colliding index value).

Table set 1140' illustrates the re-probe for "a" into code 117, which was previously an unoccupied or available code. Code 117 is then marked as occupied in the Hash Table. An entry is also created in the prefix code table at entry 117, where a value of 52 is entered. The value 52 corresponds to the code assigned to the preceding subsequence "t,e". Another entry is also created in the Append Char Table at entry 117, where a value of 0 is entered. The value 0 corresponds to the code assigned to letter "a", a baseline feature, which is the third portion of the sequence ("t, e, a") in the feature index stream. As described and illustrated a mapping is created between a hash code 117, a prefix code value for "t,e" and an append code value for "a". This process can continue for all remaining symbols as previously described.

Example Tables Using Heuristic Scoring Process

FIGS. 12A-11B are graphical diagrams illustrating an example heuristic scoring process (1200, 1200'), arranged in accordance with at least some features of the present disclosure.

For the example described below, an utterance (1201) for the phrase "cars are scarier than scarves" is processed and compared to a query (1203) for "scarves". Each symbol in the query (1203) "scarves" is mapped to an index number (1202) as illustrated.

For the described example a pattern matching length of 2 or 3 is utilized. The query term "scarves" is broken into 11 subsequences for pattern matching, namely: "sc", "ca", "ar", "rv", "ve", "es", "sca", "car", "arv", "rve" and "ves", as illustrated by 1204 in the figure. Each subsequence is compared to utterance 1201 to determine if the utterance matches the query term, as is illustrated by rows 1205. Each cell in row 1205 is either empty or contains an index number for those patterns that match. For example the row for subsequence "sc" includes indexes "0,1" for the terms "scarier" and "scarves" as illustrated.

A heuristic scoring is done for each occurrence of a matched pattern as is illustrated by heuristic scoring table 1206. However, separate rows are generated for each occurrence of a matched pattern. For example, two row are generated for the matched pattern "sc", one row for the first occurrence of matched pattern "sc" for the phrase "scarier", and one row for the second occurrence for the phrase "scarves". For similar reasons, there are three rows for the pattern "ca", four rows for the pattern "ar", two rows for the pattern "es", two rows for the pattern "sca", three rows for the pattern "car", and one row for the remaining patterns.

To quickly accumulate a heuristic score for a given utterance (e.g, 1201) given all matched regions of length <=N with a query sequence, each matched region of the utterance is processed one at a time. First patterns are check to see if the current match is actually an extension to a previously processed match. If so, then the current match length and offset location are augmented before proceeding. This pattern check can include matches where a certain number of symbols are allowed to be skipped. Then, the pattern sequence is checked to make sure that the current match is larger than any pattern it overlaps with. If the matched pattern larger than any pattern it overlaps with the score contributions from each of the smaller conflicting matches is subtracted from the score for the current matched pattern.

Each matched pattern has a score based on the length of the matched run of symbols, as well as the number of recurrences of the matched run in the utterance. Overlaps in runs of symbols are scored higher than single occurrences using an exponential relationship. To quickly accumulate a heuristic score for a given utterance (e.g, 1201) given all matched regions of length <=N with a query sequence, each matched region of the utterance is processed one at a time. First patterns are check to see if the current match is actually an extension to a previously processed match. If so, then the current match length and offset location are augmented before proceeding. This pattern check can include matches where a certain number of symbols are allowed to be skipped. Then, the pattern sequence is checked to make sure that the current match is larger than any pattern it overlaps with. If the matched pattern larger than any pattern it overlaps with the score contributions from each of the smaller conflicting matches is subtracted from the score for the current matched pattern.

IN one example, a scoring function is used as a function of the pattern match length (L) by the exponential relationship of score$=2^{2(L-1)}$. For this example, a pattern match length of 2 is worth 4 points, length 3 is worth 16 points, length 4 is worth 64 points, etc.

For the described example, the first row ("sc") has a heuristic score of 4−0=4 for the matched portion of "scarier", the second row ("sc") has a heuristic score of 4−0=4 for the matched portion of "scarves", the third row ("ca") has a heuristic score of 16−4=12 for the matched portion of "cars", the fourth row ("ca") has a heuristic score of 16−4=12 for the matched portion of "scarier", the fifth row ("ca") has a heuristic score of 16−4=12 for the matched portion of "scarves", the sixth row ("ar") has a heuristic score of 16−4=12 for the matched portion of "cars", the seventh row ("ar") has a heuristic score of 4−0=4 for the matched portion of "are", the eighth row ("ar") has a heuristic score of 64−16=48 for the matched portion of "scarier", the ninth row ("ar") has a heuristic score of 64−16=48 for the matched portion of "scarves", the tenth row ("rv") has a heuristic score of 256−64=192 for the matched portion of "scarves", the eleventh row ("ve") has a heuristic score of 1024−256=768 for the matched portion of "scarves", the thirteenth row ("es") has a heuristic score of 4096−3072=0 for the matched portion of "scarves", the fourteenth row ("sca") has a heuristic score of 0−0=0 for the matched portion of "scarier", the fifteenth row ("sca") has a heuristic score of 0−0=0 for the matched portion of "scarves", the sixteenth row ("car") has a heuristic score of 0−0=0 for the matched portion of "car", the seventeenth row ("car") has a heuristic score of 0−0=0 for the matched portion of "scarier", the eighteenth row ("car") has a heuristic score of 0−0=0 for the matched portion of "scarves", the nineteenth row ("arv") has a heuristic score of 0−0=0 for the matched portion of "scarves", the twentieth row ("rve") has a heuristic score of 0−0=0 for the matched portion of "scarves", and the twenty-first row ("ves") has a heuristic score of 0−0=0 for the matched portion of "scarves". The total score for the matched portions is 4180 as illustrated by 1207 in FIG. 12B.

Noise Floor Calculations

An analysis of noise floor derivations is described below for the number of substring matches found in random strings. A noise floor is relevant when trying to account for random matches in an approximate string matching scoring algorithm. It can be observed that in a scoring scheme where a substring match of length L in the query text Q and document text T is given a score of $4^{L-1}$ points, long document texts T receive higher scores than those documents which have the desired matches. This is due to the number of short matches that occur between the text string and query string. By examining the number of random matches that occur between two random strings of length m and n, we present a method for subtracting out scoring noise.

A set [n] denotes the set of positive integers less than or equal to n; [n]={1,2, . . . ,n}. Σ will denote a finite alphabet of symbols from which strings are constructed. The set of all strings is denoted by Σ*, and the set of strings of length n is denoted by $\Sigma^n$.

Simplified Noise Floor Derivation

Simplified analysis can be focused on the special case where the expected number of matches of length 2 is counted for two random strings. The query string of length m can be given by $Q=Q_1 Q_2 \ldots Q_m$ and the text string of length n by $T=T_1 T_{2 \ldots T_n}$. Let Σ be a finite alphabet of size S=|Σ|, and the symbols in Q and T are chosen independently and uniformly at random. Let X(Q,T) be the random variable whose value is the number of length two matches between the strings Q and T.

For example, if Q=abcdef and T=abdef, then X(Q,T)=3 (the strings ab, de, and ef occur in both Q and T). One goal is to compute the expected value of X over all strings Q of length m and strings T of length n. In the probabilistic setting the event space Ω is $\Sigma^m \times \Sigma^n$ (all pairs of strings, one of length m and the other of length n), in which the probability of any single pair $(Q_0, T_0)$ is $1/S^{m+n}$. By the law of total expectation $$E[X(Q,T)] = E[E[X(Q,T) \square Q = Q_0, T = T_0]]$$

$$\begin{aligned}
E[E[X(Q,T) \mid Q = Q_0, T = T_0]] &= \sum_{\substack{Q_0 \in \Sigma^m \\ T_0 \in \Sigma^n}} E[X(Q,T) \mid Q = Q_0, T = T_0] \cdot Pr(Q = Q_0, T = T_0) \\
&= \sum_{\substack{Q_0 \in \Sigma^m \\ T_0 \in \Sigma^n}} \frac{1}{S^{m+n}} E[X(Q,T) \mid Q = Q_0, T = T_0] \\
&= \sum_{\substack{Q_0 \in \Sigma^m \\ T_0 \in \Sigma^n}} \frac{1}{S^{m+n}} X(Q_0, T_0) \\
&= \frac{1}{S^{m+n}} \sum_{\substack{Q_0 \in \Sigma^m \\ T_0 \in \Sigma^n}} X(Q_0, T_0)
\end{aligned}$$

The random variable X can be decomposed into a family of indicator random variables. Let $X_{i,j}(Q,T)$, i ∈ [m−1], j ∈ [n−1] be an indicator random variable which is 1 if $Q_i=T_j$ and $Q_{i+1}=T_{j+1}$ and zero otherwise (that is, the strings Q and T have a length two match starting at position i in Q and position j in T). Using these indicator variables:

$$X(Q,T) = \sum_{\substack{i \in [m-1] \\ j \in [n-1]}} X_{ij}(Q,T).$$

Substituting this term in for $X(Q_0,T_0)$ in the last equation above yields:

$$E[X(Q,T)] = \frac{1}{S^{m+n}} \sum_{\substack{Q_0 \in \Sigma^m \\ T_0 \in \Sigma^n}} \left( \sum_{\substack{i \in [1,m-1] \\ j \in [1,n-1]}} X_{i,j}(Q_0, T_0) \right)$$

Rearranging the summations yields:

$$E[X(Q,T)] = \frac{1}{S^{m+n}} \sum_{\substack{i \in [m-1] \\ j \in [n-1]}} \left( \sum_{\substack{Q_0 \in \Sigma^m \\ T_0 \in \Sigma^n}} X_{i,j}(Q_0, T_0) \right)$$

This reduces the problem to one of combinatorics. By answering how many strings $Q_0$ and $T_0$ agree with a length two match starting at some positions i in Q and j in T, the value of $\Sigma_{Q0 \in \Sigma^m, T0 \in \Sigma^n} X_{i,j}(Q_0, T_0)$ can be computed. The number of such strings can be counted by using the rule of product for counting. Pick $Q_0$ arbitrarily from the $S^m$ many strings of length m. How many strings $T_0$ of length n are there such that $T_j T_{j+1}$ agrees with $Q_i Q_{i+1}$? The choice for $T_j$ and $T_{j+1}$ is fixed based on $Q_0$, but in the remaining n−2 positions there is complete freedom as to which symbols can be selected. Thus, there are $S^{n-2}$ strings T such that $X_{i,j}(Q_0, T)=1$. By the rule of product, it is concluded that:

$$\sum_{\substack{Q_0\in\Sigma^m\\ T_0\in\Sigma^n}} X_{i,j}(Q_0, T_0) = S^{m+n-2}.$$

Replacing this expression back in the last result yields:

$$\begin{aligned}
E[X(Q,T)] &= \frac{1}{S^{m+n}} \sum_{i\in[m-1],j\in[n-1]} \left( \sum_{Q_0\in\Sigma^m, T_0\in\Sigma^n} X_{i,j}(Q_0, T_0) \right) \\
&= \frac{1}{S^{m+n}} \sum_{i\in[m-1],j\in[n-1]} S^{m+n-2} \\
&= \frac{S^{m+n-2}}{S^{m+n}} \sum_{i\in[m-1],j\in[n-1]} 1 \\
&= \frac{1}{S^2}(m-1)(n-1) = O(mn)
\end{aligned}$$

It is observed that the number of random length two matches is proportional to the product of the length of the query and the length of the text.

Noise Floor Analysis: Expected Score Received by Two Random Strings

Again, let Q and T be two random strings of length m and n, respectively. Extending the results above, we can show that the expected number of length k matches between the two strings is $\Theta((m-k)(n-k)/S^k)$. Rather than compute the expected number length k matches, a weight indicating the scores is assigned that would be received under the described scoring scheme. In an example implementation, a match of length k receives a score of $4^{k-1}$. Notice that k can be selected as large as possible; although a match of length 10 has many smaller matches, they do not have to be scored. The following family of indicator functions is introduced $\{I^k\}_{k=2}^{\infty}$ to aid in analysis. Define $I^k$: $[m]\times[n]\times\Sigma^m\times\Sigma^n\rightarrow\{0,1\}$ to be the function which is 1 if the strings Q and T have a length k match starting at position i in Q and position j in T, and is zero otherwise. If the extent of the substrings specified by function parameters extends beyond the boundary of either string, then the function evaluates to zero. This would happen, for instance, by evaluating a length six match starting at the 3rd from the end symbol in string Q.

As an example, if Q=abcdefgh and T=defgi, $I^4(4,1,Q,T)=1$, but $I^3(4,1,Q,T)=0$ and $I^3(5,2,Q,T)=0$ since there is a length 4 match in Q and T which encompasses these matches. Notice that the family of functions has finite support over a set of finite strings. For every k>max(m,n), $I^k(i,j,Q,T)=0$ for any choice of i,j. The score a query string Q would receive against a text string T can be expressed as:

$$\text{Score}(Q,T) = \sum_{k=2}^{\infty} 4^{k-1} \left( \sum_{\substack{i\in[1,m-1]\\ j\in[1,n-1]}} I^k(i,j,Q,T) \right)$$

To compute E[Score(Q,T)] over strings $Q \in \Sigma^m$ and $T \in \Sigma$, the law of total expectation is applied:

$$\begin{aligned}
E[\text{Score}(Q,T)] &= E[E[\text{Score}(Q,T) \mid Q=Q_0, T=T_0]] \\
&= \sum_{\substack{Q_0\in\Sigma^m\\ T_0\in\Sigma^n}} Pr(Q=Q_0, T=T_0)\cdot E[\text{Score}(Q,T) \mid Q=Q_0, T=T_0] \\
&= \frac{1}{S^{m+n}} \sum_{\substack{Q_0\in\Sigma^m\\ T_0\in\Sigma^n}} E[\text{Score}(Q,T) \mid Q=Q_0, T=T_0] \\
&= \frac{1}{S^{m+n}} \sum_{\substack{Q_0\in\Sigma^m\\ T_0\in\Sigma^n}} \text{Score}(Q_0, T_0) \\
&= \frac{1}{S^{m+n}} \sum_{\substack{Q_0\in\Sigma^m\\ T_0\in\Sigma^n}} \sum_{k=2}^{\infty} 4^{k-1} \left( \sum_{\substack{i\in[m]\\ j\in[n]}} I^k(i,j,Q_0,T_0) \right)
\end{aligned}$$

Rearranging the summations yields:

$$E[\text{Score}(Q,T)] = \frac{1}{S^{m+n}} \sum_{k=2}^{\infty} 4^{k-1} \cdot \left( \sum_{\substack{i\in[m]\\ j\in[n]}} \left( \sum_{\substack{Q_0\in\Sigma^m\\ T_0\in\Sigma^n}} I^k(i,j,Q_0,T_0) \right) \right)$$

E[Score(Q,T)] can be bounded from below by considering the expected score generated solely by length 2 matches. In particular, $$\frac{4}{S^{m+n}} \cdot \left( \sum_{\substack{i\in[m]\\ j\in[n]}} \left( \sum_{\substack{Q_0\in\Sigma^m\\ T_0\in\Sigma^n}} I^2(i,j),Q_0,T_0) \right) \right) \leq \frac{1}{S^{m+n}} \sum_{k=2}^{\infty} 4^{k-1} \cdot \left( \sum_{\substack{i\in[m]\\ j\in[n]}} \left( \sum_{\substack{Q_0\in\Sigma^m\\ T_0\in\Sigma^n}} I^k(i,j,Q_0,T_0) \right) \right) = E[\text{Score}(Q,T)]$$

Notice that for $i \in [m-1]$ and $j \in [n-1]$, $I^2(i,j,Q,T)=X_{i,j}(Q,T)$. Furthermore, $I^2(m,j,Q,T)=I^2(i,n,Q,T)=0$ as we cannot have a length two match starting at the end of a string. Thus, $$\frac{4}{S^{m+n}} \cdot \left( \sum_{\substack{i\in[m]\\ j\in[n]}} \left( \sum_{\substack{Q_0\in\Sigma^m\\ T_0\in\Sigma^n}} I^2(i,j,Q_0,T_0) \right) \right) = \frac{4}{S^{m+n}} \sum_{\substack{i\in[m-1]\\ j\in[n-1]}} \left( \sum_{\substack{Q_0\in\Sigma^m\\ T_0\in\Sigma^n}} X_{i,j}(Q_0,T_0) \right) = 4\cdot E[X(Q,T)].$$

Substituting the above results for E[X(Q,T)], it is derived that $4(m-1)(n-1)/S^2 \leqq E[\text{Score}(Q,T)]$.

An upper bound can also be forced on the expression. Assume that a length k match is possible at every pair of positions $(i,j) \in [m]\times[n]$, regardless of the value of k.

Lemma 1 The number of pairs of strings $(Q_0, T_0)$ for which $I^k(i,j,Q_0,T_0)=1$ is no greater than $S^{m+n-k}$ Proof: Without loss of generality, assume that i,j are such that a length k match is possible starting at those positions in Q and r, respectively. Let A be the set of pairs (Q,T) such that $Q[i, i+k-1]=T[j, j+k-1]$. It's clear that there are $S^{m+n-k}$ such pairs by examining the choice tree when constructing suitable strings Q and T. We will show that the set B of pairs $(Q_0, T_0)$ such that $I^k(i,j, Q_0, T_0)=1$ is a subset of A, and thus $|B|\leqq|A|$. The subset argument is trivial: Let $Q_0 \in \Sigma^m$ and $T_0 \in \Sigma^n$ be arbitrary in B. A necessary condition of this is that $I^k(i,j,Q_0, T_0)=1$, and hence $Q_0[i, i+k-1]=T_0[j,j+k-1]$. This implies that $(Q_0, T_0) \in A$, and as $(Q_0, T_0)$ was chosen arbitrarily in B it follows that $B \subset A$.

By the previous lemma, we know that for any i, j pair $$\sum_{\substack{Q_0\in\Sigma^m \\ T_0\in\Sigma^n}} I^k(i, j, Q_0, T_0) \le S^{m+n-k}.$$

Therefore, $$\sum_{\substack{i\in[m] \\ j\in[n]}}\left(\sum_{\substack{Q_0\in\Sigma^m \\ T_0\in\Sigma^n}} I^k(i, j, Q_0, T_0)\right) \le mnS^{m+n-k}$$

We can refine this result further by noting that whenever i=m or j=n, $I^k(i, j, Q_0, T_0)=0$ as it's impossible to have a match of length 2 or more starting at the end of a string. Thus, $$\sum_{\substack{i\in[m] \\ j\in[n]}}\left(\sum_{\substack{Q_0\in\Sigma^m \\ T_0\in\Sigma^n}} I^k(i, j, Q_0, T_0)\right) = \sum_{\substack{i\in[m-1] \\ j\in[n-1]}}\left(\sum_{\substack{Q_0\in\Sigma^m \\ T_0\in\Sigma^n}} I^k(i, j, Q_0, T_0)\right) \le (m-1)(n-1)S^{m+n-k}$$

Substituting this result in the equation for E[Score (Q,T)], we have that $$\begin{aligned} E[\text{Score}(Q, T)] &= \frac{1}{S^{m+n}}\sum_{k=2}^{\infty} l^{k-1}\cdot\left(\sum_{\substack{i\in[m] \\ j\in[n]}}\left(\sum_{\substack{Q_0\in\Sigma^m \\ T_0\in\Sigma^n}} I^k(i, j, Q_0, T_0)\right)\right) \\ &\le \frac{1}{S^{m+n}}\sum_{k=2}^{\infty} l^{k-1}\cdot((m-1)(n-1)S^{m+n-k}) \\ &= \frac{(m-1)(n-1)S^{m+n}}{S^{m+n}}\sum_{k=2}^{\infty}(1/4)4^k S^{-k} \\ &= \frac{(m-1)(n-1)}{4}\sum_{k=2}^{\infty}(4/S)^k \\ &= \frac{(m-1)(n-1)}{4}(4/S)^2\frac{1}{1-4/S} \\ &= \frac{4(m-1)(n-1)}{S^2(1-4/S)} \end{aligned}$$

At this point we assume that S>4. In general this is not a necessary requirement as the family of functions $\{I^k\}$ has only finitely many functions which aren't constantly zero, for a fixed length query string and text string. However, to simplify the analysis we represented the summation over match lengths as an infinite sum, understanding that only finitely many of these terms don't matter. In the case where we have a large alphabet, the probability of matches of length k decays exponentially faster than the score for length k matches increases. Thus, the infinite series representing an upper bound on the scores converges.

In conclusion, we have that $$\frac{4(m-1)(n-1)}{S^2} \le E[\text{Score}(Q, T)] \le \frac{4(m-1)(n-1)}{S^2(1-4/S)}$$

It is interesting to note how tight these bounds become as S gets large. When S is large, the probability of two length k strings being equal is $1/S^k$. The expected score such a match would get is then $1/4(4/S)^k$. We see that for modest sized alphabets, the expected contribution of long matches to the score decreases quickly. Therefore, when computing the expected score two random strings would receive, a good approximation is to consider only the contributions of length two (and possibly length 3) matches.

Example Computing Device

Figure 13:
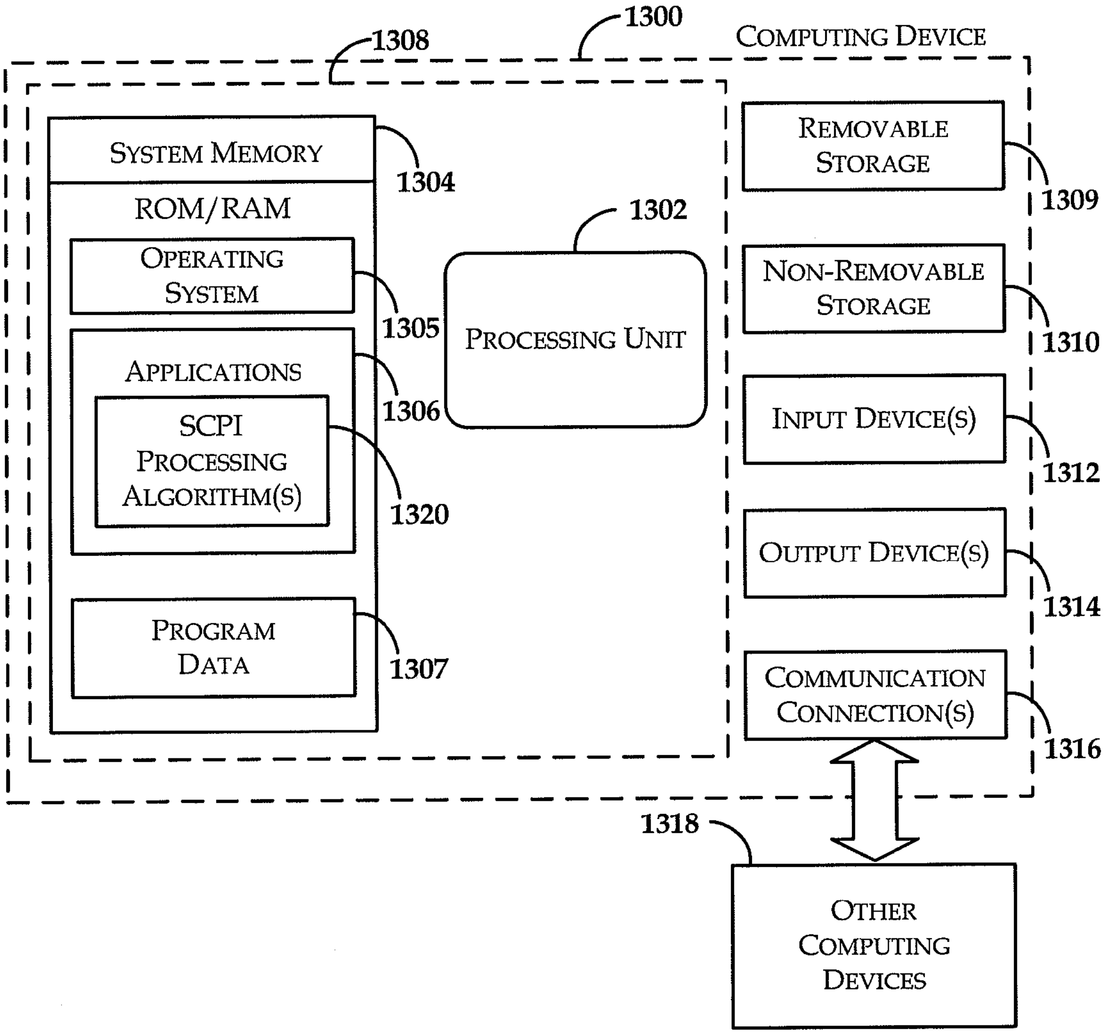
FIG. 13 is a block diagram of an example computing device.

FIG. 13 is a block diagram illustrating an example computing device (1300) that is arranged in accordance with at least some features of the present disclosure. In a very basic configuration, computing device 1300 typically includes at least one processing unit (1302) and system memory (1304). Depending on the exact configuration and type of computing device, system memory 1304 may be volatile (such as RAM), non-volatile (such as ROM, flash memory, etc.) or some combination of the two. System memory 1304 typically includes an operating system (1305), one or more applications (1306), and may include program data (1307).

Application 1306 includes a SCPI processing algorithm (1320) that is arranged to process queries, updates and other appropriate functions for storing, indexing, retrieving, updating, promoting, splitting, and any other relevant functions that are necessary for managing a quantum indexed graph-like data structure. In one embodiment, application 1306 is also arranged to process time domain signals from a user interface, extract and quantize features from the time domain signals, buffer quantized features from a feature index stream, associate time domain data with the feature index streams, and generate and/or search a graph-like data structure for content that is associated with a quantum index. FIGS. 14A-14D illustrate example pseudo-code for insertion, queries, traversal, compression, and heuristic scoring for a graph-like data structure which can be used by computing device 1300, for example. This basic configuration is illustrated in FIG. 13 by those components within dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by removable storage 1309 and non-removable storage 1310. Computer storage media may include volatile and nonvolatile, removable and non-removable media implemented in any method or technology for storage of information, such as computer readable instructions, data structures, program modules, or other data. System memory 1304, removable storage 809 and non-removable storage 1310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of device 1300. Computing device 1300 may also have input device(s) 1312 such as keyboard, mouse, pen, joystick, stylus, voice input device, touch input device, etc. Output device(s) 1314 such as a display, speakers, printer, etc. may also be included.

Computing device 1300 also contain communication connections 1316 that allow the device to communicate with other computing devices 1318, such as over a network. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR) and other wireless media. The term computer readable media as used herein includes both storage media and communication media.

Computing device 1300 can be implemented as a portion of a small-form factor portable (or mobile) electronic device such as a cell phone, a personal data assistant (PDA), a personal media player device, a wireless web-watch device, a personal headset device, an application specific device, or a hybrid devices that include any of the above functions. Computing device 1300 can also be implemented as a personal computer including both laptop computer and non-laptop computer configurations.

Example Pseudo-Code Processes

FIGS. 14A-14D illustrate example pseudo-code for insertion, queries, traversal, compression, and heuristic scoring for a graph-like data structure. SCPI can be implemented as an inverted n-gram symbol index using tables such as illustrated in FIGS. 11A-11B. At insertion time the incoming sequence of feature indexes is insertion time by creating 2-gram, 3-gram, . . . MaxNGram nodes of all 2-gram, 3-gram, . . . MaxNGram sub-sequences. At query time, the n-grams from the query sequence are evaluated and possible matches are identified for those query sequence matches that already exist for previously observed sequences. Heuristic scoring can then be utilized to identify long contiguous matching runs even when fragmented, i.e. "holes" occur in the sequence.

Both insert and query algorithms can be implemented as 1-pass algorithms that only visit each symbol (or feature index) position once, i.e. they are O(N) in the length of the inserted and queried strings. However, each symbol participates in all n-grams (building at insertion time and matching at query time) that it happens to be contiguous with.

FIG. 14A illustrates pseudo code for an example insertion process, where each position in the sequence of feature indexes is evaluated using a hashed tree traversal process. New nodes can be created in the tree by linking the fields of the tables such as illustrated in FIGS. 11A-11B. Runs of feature indexes in a steam can be extended by simply adding an additional hash table entry as previously discussed. Once the insertions are completed, the table entries can be compacted.

FIG. 14B illustrates pseudo code for an example query process, where each position in the sequence of feature indexes is again evaluated using a hashed tree traversal process. When a matched node exists, the current run is extended and the process continues until all hashed traversals are completed. The results can be scored such as using the heuristic scoring methods previously discussed.

FIG. 14C illustrates pseudo code for an example hashed-tree traversal process, where a hash code is computed for each feature index in the current run. New sequences and matched sequences can be identified by the hashed-tree traversal process. Matched sequences for insertions can result in collisions, so a re-probing function can be included in the hashed-tree traversal process to handle collisions by offsetting the hash code as previously discussed. The hashed tree traversal scheme is an extremely efficient (constant time) way to see if incoming symbol streams can be extended, both at insert and at query time.

FIG. 14D illustrates pseudo code for an example path compression process (similar to the promotion process previously described), and a scoring process. The path compression process evaluates each sequence and sub-sequence in the n−1 gram nodes, and extends sequences that have matches to conserve space. The scoring process forms a union of all feature index sequences (e.g., utterances) that match until the n−1 gram index, and also form s a union of all feature indexes that match until the n-gram index. The differences between the two unions are scored exponentially as previously described.

Queue-based processing can be used for both insert and query as illustrated by the pseudo-code. What this means is that there is a queue of things that propagates from symbol position to symbol position. At each symbol we adjust either the index (at insertion time) or the matching runs to process the queue, add new things to the queue, take out expired entries (these are the sequences that exceed MaxNGrams at insert time and the ones that stop matching at query time), and the queue moves to the next symbol position. One pass of this queue through the sequence, and we are done.

The insert and query algorithms (both of which use the above queue-based mechanism) illustrated in the pseudo-code are symmetric in that they do nearly the same kinds of things to update the index, or query it for a match. The query algorithm proceeds by means of finding all matches with proper subsets. It is trivial to prove that all sequences that match on an n-gram must also match on all n−1 grams that match with the n-gram in the first n−1 symbol positions, i.e. matching prefixes. This allows the process to effectively "harvest" all nodes that fall out of the matching run at each symbol position, and add their scores to the list of results. This design, besides being easy to prove correct, is also cache friendly, because we start by caching the biggest sets of matches, and refine that by subsetting as we proceed down the query sequence.

The insert and query algorithms are nearly symmetric. A systolic version for the core SCPI algorithms can be proposed. In a systolic algorithm we allow for parallel paths for data (in this case, the symbols) to enter the processing pipeline. The end effect is that once the length of the pipeline is ideally tuned for the application, then at steady state (i.e. once the pipeline is full of queued entities), then the observable throughput is the ideal/optimum of n result every time instant, where n is the pipeline depth. This gives us the capability of realizing the SCPI algorithm on custom silicon (ASIC) or FPGA to give extremely fast data processing capability. Such an algorithm could conceivably be useful in domains where large data sets and symbol sequencing operations are needed, e.g. genome sequencing, large multi-media search engines (i.e. Google-compete), etc. Additionally, because of symmetry, the same circuits could be re-used for insertion and querying, e.g. by mode switching FPGAs.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computing device that is arranged to manage a quantum indexed graph data structure, the computing device comprising:

a processing unit that is arranged to execute instructions to manage the quantum indexed graph data structure; and a system memory that is arranged to store the instructions for execution by the processing unit, wherein the executable instructions are arranged for:

extracting a first ordered set of atomic values from a sequence that is associated with a new content;

creating a new context node for the quantum indexed graph data structure;

associating the new context node with all of the new content; wherein the new context node stores all of the new content that is included in different nodes at a hierarchical level below the new context node; wherein the new context node serves as an index for the new content;

identifying common nodes in the quantum indexed graph data structure, wherein each common node includes a second ordered set of atomic values that match at least a portion of the first ordered set of atomic values;

linking the new context node to all identified common nodes; wherein the identified common nodes are at a hierarchical level below the new context node;

creating new leaf nodes for any portion of the first ordered set of atomic values that are not identified with common nodes;

linking the new context node to all new leaf nodes; wherein the new leaf nodes are at a hierarchical level below the new context node;

assigning sequence order values to all links from the new context node based on the first ordered set of atomic values; and adding the new context node to the quantum indexed graph data structure such that the content is indexed according to the first ordered set of atomic values.

2. The computing device of claim 1, wherein the executable instructions for extracting the first ordered set of atomic values further comprises: identifying a set of feature indexes in the sequence, and assigning each atomic value in the first ordered set to a corresponding feature index from the set of feature indexes in the sequence.

3. The computing device of claim 1, wherein the executable instructions for extracting the first ordered set of atomic values further comprises: identifying a set of feature indexes in the sequence, and grouping adjacent portions feature indexes from the set of feature indexes according to their order in the sequence based on a minimum sequence length associated with a smallest atomic value.

4. The computing device of claim 1, wherein the executable instructions for creating new leaf nodes further comprises: selecting a group of sequentially ordered feature indexes according to a minimum sequence length associated with a smallest atomic value, and forming a leaf node with the group of sequentially ordered feature indexes.

5. The computing device of claim 1, wherein the executable instructions for identifying common nodes in the quantum indexed graph data structure further comprises: selecting a candidate node in the quantum indexed graph data structure, identifying the second ordered set of atomic values for the selected candidate node, determining if the second ordered set of atomic values occur within the first ordered set of atomic values, and identifying the selected candidate node as a common node when the second ordered set of atomic values occur within the first ordered set of atomic values.

6. The computing device of claim 1, the executable instructions further comprising: locating a cluster of common nodes for the identified common nodes that share a common root node, and splitting the cluster of common nodes from the common root node.

7. The computing device of claim 6, the executable instructions for splitting the cluster of common nodes further comprising: creating a new root node for the cluster of common nodes, linking the new root node to each corresponding node from the cluster of common nodes, updating sequence order values for each link to each corresponding node from the cluster of common nodes, and linking the common root node to the new root node, and updating the sequence order values for the common root node.

8. The computing device of claim 1, the executable instructions further comprising: tracking a corresponding frequency of each corresponding context node, and promoting each context node that has a corresponding frequency of use that exceeds a threshold.

9. The computing device of claim 1, the executable instructions further comprising: querying the quantum indexed graph data structure with a search term, traversing the graph data structure to locate candidate context nodes, comparing each candidate context node to the search term, and identifying a possible sequence match when at least one of the atomic values associated with the candidate context node matches at least one atomic value associated with the search term.

10. The computing device of claim 9, the executable instructions further comprising retrieving the content associated with the candidate context node that is identified as a sequence match.

11. The computing device of claim 9, the executable instructions further comprising maintaining a corresponding counter for each context node, incrementing the corresponding counter for the candidate context node when a sequence match is identified, and promoting the candidate context node when the corresponding counter exceeds a threshold.

12. The computing device of claim 9, the executable instructions further comprising applying a heuristic scoring process to the possible sequence match, wherein each possible sequence match has a heuristic score indicative of a likelihood of a match between the candidate context node and the query term, and sorting the possible sequence matches based on the heuristic score.

13. The computing device of claim 12, the executable instructions for applying the heuristic scoring process further comprising calculating the heuristic score (heuristic_score) for each possible sequence match from the length of the match (MatchLength) and the number of overlaps from other matches (Overlaps), wherein heuristic_score=$2^{MaxLength}-2^{Overlaps}$.

14. The computing device of claim 12, the executable instructions further comprising applying a noise filter process to modify the heuristic score for each possible sequence match.

15. The computing device of claim 14, the executable instructions for applying the noise filter process further comprising: subtracting a noise floor value from the heuristic score, wherein the noise floor value for the possible sequence match corresponds to: $[4(m-1)(n-1)]/[S^2(1-4/S)]$, where m is the length of the query term, n is the number of indexed feature sets, and S is the size of the set of atomic values.

16. The computing device of claim 1, the executable instructions further comprising querying the quantum indexed graph data structure with a search term, hashed-tree traversing the graph data structure to locate candidate context nodes, comparing each candidate context node to at least a portion of the search term, and identifying possible sequence matches when at least one of the atomic values associated with the candidate context node matches at least one atomic value associated with the search term.

17. The computing device of claim 16, the executable instructions for hashed-tree traversing the graph data structure further comprising: selecting at least one atomic value associated with the search term, shifting the selected at least one atomic value by a hashing shift amount, and exclusive ORing the shifted atomic value with an old hash code to generate a new code, and determining whether the new code is already occupied.

18. The computing device of claim 17, the executable instructions further comprising calculating a re-probe code by offsetting the new code when collisions are detected with the new code.

19. A computer implemented method for managing a quantum indexed graph data structure, the method comprising:

extracting a first ordered set of atomic values from a sequence of feature indexes that is associated with a new content;

creating a new context node for the quantum indexed graph data structure;

associating the new context node with the new content; wherein the new context node stores all of the new content that is included in different nodes at a hierarchical level below the new context node; wherein the new context node serves as an index for the new content;

identifying common nodes in the quantum indexed graph data structure, wherein each common node includes a second ordered set of atomic values that match at least a portion of the first ordered set of atomic values;

linking the new context node to all identified common nodes; wherein the identified common nodes are at a hierarchical level below the new context node;

creating new leaf nodes for any portion of the first ordered set of atomic values that are not identified with common nodes;

linking the new context node to all new leaf nodes; wherein the new leaf nodes are at a hierarchical level below the new context node;

assigning sequence order values to all links from the new context node based on the first ordered set of atomic values; and adding the new context node to the quantum indexed graph data structure such that the content is indexed according to the first ordered set of atomic values.

20. The computer implemented method of claim 19, wherein each feature index is either a numerical index or a symbolic name that is mapped to a characteristic feature of the content.

21. The computer implemented method of claim 20, wherein each feature index is a numerical index that is mapped to one member of a group of acoustic phonemes that represent human speech.

22. The computer implemented method of claim 20, wherein the content corresponds to at least one member of the group comprising: a digitally encoded audio signal, a digitally encoded video signal, a digitally encoded photographic image, and a file.

23. The computing implemented method of claim 20, wherein extracting a first ordered set of atomic values further comprises grouping adjacent portions of feature indexes from the sequence of feature indexes according to their order in the sequence based on a minimum sequence length associated with a smallest atomic value.

24. The computing implemented method of claim 21, further comprising locating a cluster of common nodes for the identified common nodes that share a common root node, and splitting the cluster of common nodes from the common root node.

25. A tangible computer-readable medium having computer-executable instructions for managing a quantum-indexed graph data structure, comprising:

extracting a first ordered set of atomic values from a sequence of feature indexes that is associated with a new content, where each atomic value corresponds to one or more feature indexes that occur in sequence based on a minimum sequence length;

creating a new context node for the quantum indexed graph data structure;

associating the new context node with the new content; wherein the new context node includes all of the new content that is included in different nodes at a hierarchical level below the new context node; wherein the new context node serves as an index for the new content;

identifying common nodes in the quantum indexed graph data structure, wherein each common node includes a second ordered set of atomic values that match at least a portion of the first ordered set of atomic values;

linking the new context node to all identified common nodes; wherein the identified common nodes are at a hierarchical level below the new context node;

creating new leaf nodes for any portion of the first ordered set of atomic values that are not identified with common nodes;

linking the new context node to all new leaf nodes; wherein the new leaf nodes are at a hierarchical level below the new context node;

assigning sequence order values to all links from the new context node based on the first ordered set of atomic values; and adding the new context node to the quantum indexed graph data structure such that the content is indexed according to the first ordered set of atomic values.

* * * * *